US012405969B2

(12) United States Patent
Rohm et al.

(10) Patent No.: US 12,405,969 B2
(45) Date of Patent: Sep. 2, 2025

(54) SYSTEM FOR PROVIDING TRACKING DATA

(71) Applicant: Tracify GmbH, Munich (DE)

(72) Inventors: Markus Rohm, Graben (DE); Marius Rudolf, Munich (DE)

(73) Assignee: Tracify GmbH, Munich (DE)

( * ) Notice: Subject to any disclaimer, the term of this patent is extended or adjusted under 35 U.S.C. 154(b) by 0 days.

(21) Appl. No.: 18/389,180

(22) Filed: Nov. 13, 2023

(65) Prior Publication Data

US 2024/0086425 A1 Mar. 14, 2024

Related U.S. Application Data

(63) Continuation-in-part of application No. PCT/EP2022/083462, filed on Nov. 28, 2022.

(30) Foreign Application Priority Data

Dec. 3, 2021 (EP) .................................... 21212384

(51) Int. Cl.
*G06F 16/28* (2019.01)
*G06N 5/025* (2023.01)

(52) U.S. Cl.
CPC ........... *G06F 16/285* (2019.01); *G06N 5/025* (2013.01)

(58) Field of Classification Search
None
See application file for complete search history.

(56) References Cited

U.S. PATENT DOCUMENTS

| | | | |
|---|---|---|---|
| 2002/0174010 A1* | 11/2002 | Rice, III | G06F 16/182 705/14.67 |
| 2005/0027605 A1* | 2/2005 | Chen | G06Q 30/0633 705/26.8 |
| 2010/0094704 A1 | 4/2010 | Subramanian et al. | |
| 2013/0339127 A1* | 12/2013 | Plut | G06Q 30/02 705/14.42 |
| 2018/0307859 A1 | 10/2018 | Lafever et al. | |
| 2019/0295087 A1* | 9/2019 | Jia | G06N 20/00 |
| 2020/0134701 A1* | 4/2020 | Zucker | H04N 7/181 |

OTHER PUBLICATIONS

International Search Report mailed in application PCT/EP2022/083462, mailed on Mar. 14, 2023.

* cited by examiner

*Primary Examiner* — Kannan Shanmugasundaram
(74) *Attorney, Agent, or Firm* — ALG Intellectual Property, LLC

(57) ABSTRACT

A system for providing tracking data includes a processing component configured to: receive an event dataset including a plurality of entity identifiers, generate a tracking identification based on the entity identifiers, generate a plurality of identification groups based on a subset of entity identifiers, determine a similarity measure between the tracking identification and an identification group of the plurality of identification groups, and assign the tracking identification to one of the identification groups based on the similarity measure.

19 Claims, 5 Drawing Sheets

SYSTEM FOR PROVIDING TRACKING DATA

RELATED APPLICATIONS

This application is a continuation-in-part of International Application No. PCT/EP2022/083462 filed Nov. 28, 2022, which claims priority to EP Patent Application No. 21212384.8 filed Dec. 3, 2021, each of which is hereby incorporated by reference in its entirety.

BACKGROUND INFORMATION

This application relates to tracking technology and data privacy technology and in particular to an anonymized tracking of user actions using machine learning. The goal of the application is to provide tracking data, in particular in the form of interaction data for a plurality of entities spanning across communication sessions and/or communication devices.

Tracking data can represent a sequence of events generated based on user interactions with an interface and/or platform, wherein the sequence can be assigned to a user. However, the sequence of events can be broken by a plurality of circumstances and thus diminish the quality of the tracking as only fragmented user journeys can be generated. Typically, linking these fragmented user journeys provides a substantial challenge.

A user may pause a series of events, which may cause the system to time out and discontinue the sequence of events and instead start a new series unconnected to the first (i.e., the system assumes that two separate users are interacting with the platform). Alternatively, the user may switch devices (i.e., from a mobile device to a desktop computer). Furthermore, the user may switch its network connection, switch the application (i.e., switch the web browser and/or alter its network settings (i.e., reconnect, switch from a cellular connection to a wireless network connection, start a VPN service etc.). Each of these actions may sever an otherwise cohesive user action, respectively user journey.

Furthermore, blocking modules (i.e., ad blockers, virus scanners etc.) may intentionally hinder tracking the user. This can create the disadvantage of decreased tracking data quality as the chance for event sequences to be disconnected increases.

Tracking can be achieved via the use identification data packets (i.e., cookies) configured to track the user's activity (i.e., clicking particular buttons, logging in, or recording which pages are visited). These cookies, however, can have a limited life span or can be prevented from use all together. Thus, tracking based on cookies is unreliable and can decrease the tracking quality.

Additionally, the lifetime of an identification packet can be limited to a specific time interval. Thus, any cohesive user tracking based on a time limited cookie can be restricted to the time interval. This can generally limit any cohesive tracking across sessions.

With decreasing tracking quality, the measuring of the effectiveness of advertisements can be less accurate. Thus, without a diminished tracking the uncertainty through which channel a user initiated a session with the platform increases. This increases the inefficiency of advertisements. For example, some advertisement channels may not be used or have a low impact. Due to a reduced tracking quality a platform can be hindered in identifying recurring customers.

Tracking can be achieved by the use of tracking pixels, which can be a graphic element embedded in a website, in particular a landing page for a platform. Upon loading of the landing page, the tracking pixel is loaded and captures the visit of the user. However, tracking pixels increase the overhead and/or decrease the loading speed of the website. With an increasing number of tracking pixels this delay can amount to a substantially decreased loading performance.

Furthermore, the use of a tracking systems can be limited by national standards and/or privacy requirements. Implementing tracking systems that do not adhere to local standards (i.e., transfer tracking data across union, state and/or country borders) may contravene local data privacy laws. This may even apply to tracking with given user consent.

SUMMARY

In light of the above, it is therefore an object of the present invention to overcome or at least to alleviate the shortcomings and disadvantages of the prior art. More particularly, it is an object of the present invention to provide a system and a corresponding method for providing tracking data with an increased tracking quality, in particular across devices and/or across sessions.

These objects are met by the present invention.

According to a first aspect the present invention relates to a system for providing tracking data comprising a processing component configured to receive an event dataset comprising a plurality of entity identifiers, to generate a tracking identification based on the entity identifiers, to generate a plurality of identification groups based on a subset of entity identifiers, to determine a similarity measure between the tracking identification and an identification group of the plurality of identification groups and to assign the tracking identification to one of the identification groups based on the similarity measure.

The system achieves the advantage of providing tracking data of an entity across interaction sessions and/or across devices. In particular, the system can track an entity without the need to present a consent opt-in choice. This can be achieved by tracking the entity within the confines of a set of data privacy rules. The processing of available entity data can be limited to data elements, which are not regulated by the set of data privacy rules and thus may not require an active consent of the entity. Furthermore, the system may operate independent of login information and/or account information of the entity.

Tracking data can be defined as data comprising identifying information, in particular uniquely identifying information pertaining to a specific entity. The tracking data can comprise a set of entity specific, action/interaction specific and/or device specific data elements. The tracking data can further comprise product data, location data and/or time data.

The system can further be configured to generate an entity footprint, hardware footprint, script footprint and/or an action footprint. A footprint can be defined as a unique set of data elements configured to identify the respective descriptor. The system, preferably the processing component, can be configured to adapt to any type of identifiable, in particular unique, identifier and to incorporate the respective identifier into the set of data elements on which generating the footprint is based. This achieves the advantage that the system can be adaptable with respect to new identifiers, in particular previously not considered identifiers, newly developed identifiers and/or hardware changes. For example, the hardware footprint can comprise at least one of the following data elements: audio device data, canvas data pertaining to display settings, contrast data pertaining to a display, CPU class and/or CPU type data, hardware concurrency data pertaining to a number of concurrent threads supported by the implementation, available memory data, available storage space data, domain blocker data pertaining to whether an advertisement blocking software is installed, language settings data, platform information data pertaining to the software platform the entity session is initiated on, device operation system data, browser information data, browser version data, time zone data, installed plugins data and/or manufacturer hardware data.

Additionally, the footprint can comprise data pertaining to the input device, in particular whether input is provided via a mouse, keyboard, stylus, microphone, camera or haptic sensor device (i.e., a touch display, a fingerprint sensor etc.). Preferably, the event dataset can comprise key movements and/or patterns of a keyboard, characteristic mouse movements and/or characteristic swipe movements.

According to a further advantageous embodiment, the footprint can comprise data pertaining to the placement of a font. In particular, this can relate to the number and/or sequence of fonts installed and/or available on a specific system. The system can be configured to include any element of any footprint into an event dataset and/or resulting tracking dataset.

The system can include network device information into any footprint. In particular, network interface parameters, network router parameters and/or connection specific parameters (i.e., throughput data, synchronization data, IP, MAC, time since last reconnect etc.) can be included.

A script footprint can comprise platform data, wherein platform data can pertain to an identification of a service provider, respectively communication session and/or content provider (i.e., a social media service, internet search provider, media streaming provider, shopping means provider). The script footprint can further comprise an IP address associated to the active communication session, a location information, a traffic monitor parameter, an electronic (E)-Tag (i.e., a version cookie) and/or cookie data pertaining to a set of used cookies.

The system can be configured to indirectly track entity specific data, such as a name, surname, email address(es), cell phone number, home address, business address. Herein the system can be configured to associated the entity specific data to an event dataset based on the available footprint data. In particular, the entity specific data may not be provided by the entity directly. This can achieve the advantage of not requiring a consent by the entity and/or may not require the entity to provide entity specific data directly to the system.

The event dataset can comprise data relating to webpages being accessed by the entity and/or displayed by a node. The processing component may generate an entity trajectory, wherein the entity trajectory can comprise a sequence of webpages accessed by the entity and/or further comprising time interval information relating to the time interval between webpage accesses. The webpage sequence may represent an entity journey, respectively entity process, i.e., researching an item and/or item category, shopping for an item and/or item category, consuming a media type and/or media category.

The entity trajectory may represent an entity action. An entity action can be one of the following:
 adding an item to a shopping cart (ATC);
 initiating a checkout (IC);
 commencing a purchase (PUR);
 website visit (WV);
 content view (CV).

A content view can be a method of capturing and analyzing the behavior and preferences of a user on a website. A content view may include information such as the type, duration, frequency, location, and/or sequence of the user's interactions with the website's content. A content view may also include feedback from the user, such as ratings, comments, likes, shares, or purchases.

A content view may comprise tracking data relating to how long a user spends on each section of a respective display element, and/or which display elements the user focuses on. A content view may record how many times a user clicks on a product image, and/or what features zooms in on.

A content view can comprise data beyond a website visit as it can comprise a contextual representation of the user's engagement with the website's content. A content view can capture any data that is considered as a relevant and distinctive indicator or pattern of the user's behavior, interest, or feedback, regardless of the type or format of the content.

For example, a content view can be defined as accessing a product detail page comprising further information pertaining to a specific product. The event dataset may further comprise scroll depth data pertaining to a length of webpage, in particular measured in vertical screen space. Furthermore, the event dataset can comprise visit-to-purchase timing data pertaining to the time interval between a visit, in particular a first visit, to a webpage and an entity action (i.e., ATC, IC, PUR).

The entity action can comprise a predetermined conversion event which indicates a significant action, in particular a significant target action to be completed by the user. Capturing the significant target action can indicate a milestone, i.e., completion of a predetermined goal. The processing component can be configured to identify the predetermined conversion event and/or to group actions leading to the significant target action, in particular to link a set of previous entity actions to the conversion event. The conversion event can for example be a purchase (PUR). A conversion event can be a desired action that a user performs. A conversion event can indicate that the user has moved from being a passive visitor to an active customer or lead.

The entity database may further comprise any set of parameters, respectively data elements available via the entity footprints.

The tracking identification can be a representation of the event dataset and/or of a set of entity identifiers. In particular, the tracking identification can be a unique and/or unambiguous mapping of a set of the entity identifiers. The tracking identification can be unique to a communication session, platform session and/or node session. Herein, a session can be defined as a continuous interaction of an entity with a node, a continuous set of actions performed within a predetermined time interval, a continuous set of actions defined by a starting action and a closing action and/or a set of actions within an initiated and then terminated communication session.

An identification group can initially be defined based on a subset of entity identifiers. Thereby, the identification group can represent a larger parameter space section than a single event dataset represents into which a plurality of event datasets can be grouped. The processing component can be configured to assign a plurality of event datasets to an identification group based on the respective dataset to be assigned matching the parameter space section represented by the identification group. More generally, an identification group can be configured to represent a unique entity, wherein each event dataset assigned to the identification group facilitates the tracking of the respective unique entity. The identification group can be a reduced representation of the entity in such a way that a reconstruction of personal information of the entity is limited or prevented based on the data contained within the identification group. Thus, the identification group can represent an entity within the confines of data privacy rules such that the entity is unambiguously traceable but only a limited set entity identifiers or no entity identifiers can be reconstructed from the data available in the identification group.

The similarity measure can be a comparison of an entity identifier value with an entity identifier value assigned to a specific identification group. Thus, the processing component can be configured to compare entity identifier values with group identifier values and assign the event dataset to a group when at least one identifier value of the event dataset matches a group identifier value assigned to an identification group. A group identifier value can be a single value or parameter range of an entity identifier which is assigned to an identification group, in particular uniquely and/or unambiguously assigned to an identification group.

The similarity measure can be a correlation of entity identifier values with group identifier values. Thus, the processing component can be configured to assign an event dataset to an identification group, when a predetermined correlation threshold is exceeded.

Each entity dataset can be represented in vector or matrix form. An entity vector can represent an event generated by an entity within a set parameter space. Each vector entry can represent a specific parameter. Determining a similarity measure of an entity dataset and an identification group can comprise calculating the distance between the corresponding vectors. Consequently an identification group can be represented as a value range for each corresponding parameter of an entity dataset. More specifically, an identification group, can represent a value range for a subset of entity identifiers.

When the distance of an entity dataset and an identification group is below a proximity threshold value, one the entity dataset can be assigned to that identification group. This identification can be linked to the entity dataset, in particular in the form of meta data.

A Euclidean distance or other distance measures can be used. This matching can be performed for each event dataset received by the processing component.

The tracking identification can be a universally unique identifier (UUID) and/or a hash value. This achieves the advantage of linking a unique and/or anonymous identifier to an event dataset. Hashing the tracking identification can obfuscate the true identity of the entity. Furthermore, a UUID can function as a primary key for a database and therefore increase speed and efficiency of storing an event dataset in a database structure on the basis of a UUID.

The Tracking identification can be unique. This achieves the advantage that a singular identifying data element can be linked to the entity.

The system is configured to provide accurate measurements of unique entities interacting with a platform. The system can track entity behavior, with a flexible approach to capture entity behavior client and/or server side while providing control of the captured event data. Additionally, the system can provide the advantage of an early-stage anonymization of entity event data to fulfill data privacy requirements. The system is configured to identify unique entities, click paths, and return recurrence metrics (i.e., first time visitors, returning visitors, and frequency of interactions). The processing component can be configured to encrypt the event dataset. Thus, the event dataset can be shielded from third-party access. In particular, the encrypted transfer of event datasets can fulfil data privacy requirements. A gate module can have unencrypted access to the event dataset. Identifying and/or tracking of an entity can be achieved at the gate module. Preferably a tracking identification can be provided at the gate module.

The processing component can be configured to assign a group identifier to each identification group. The group identifier can be a globally unique identifier (GUID). This can achieve the advantage that the entity can be uniquely identifiable across devices and/or sessions.

The group identifier can be a universal unique identifier (UUID) and/or a hash value. This can achieve the advantage of storing a group identifier more efficiently. Hashing the group identifier can provide a more reliable and more flexible method of data retrieval.

Each identification group may represent an entity. Thereby, an entity can be identified by associating an event dataset to an identification group. The groups can be sparsely spaced such that an unambiguous identification of an entity via an event dataset and the corresponding identification group can be achieved. Sparsely spaced can be defined such that the distance between the identification groups in the parameter space spanned by the parameters of the identification group exceeds a predetermined distance threshold value. This can increase the probability that an event dataset is sufficiently far away from any other group than its designated identification group such that a misassigning of an event dataset can be prevented or the probability of such an event can be vastly reduced.

The processing component can be configured to determine a similarity measure between the tracking identification and each identification group of the plurality of identification groups and to assign the tracking identification to one of the identification groups based on the similarity measure indicating the greatest similarity between the tracking identification and the identification group. Thus, an event dataset created based on an interaction of a specific entity can be assigned to the identification group representing the specific entity. Furthermore, when no close match of an event dataset can be achieved and/or a likelihood threshold value is exceeded a new identification group can be created representing a new entity. Similarly, when two separate groups each comprise a plurality of event datasets and a distance within the parameter space for two datasets assigned to different identification groups is undercut, the processing component can be configured to merge the two identification groups into one identification group. Thus, two identification groups previously considered separate can be merged to represent one true entity based on the increasing number of event datasets representing the entity in more detail.

The processing component can be configured to identify an entity based on the tracking identification being assigned to a specific identification group. This achieves the advantage that due to the similarity of an event dataset to a parameter range and/or parameter set of a specific identification group an entity can be matched to the event dataset. Thus, assigning the event dataset correlates to identifying the entity which caused the event dataset without actually receiving information identifying the entity directly within the event dataset. Thus, the event dataset can adhere to a set of data privacy rules and the system may still track and/or identify a respective entity.

The system can comprise a database module configured to store event datasets with the assigned group identifier. The database module can be configured to store the event datasets in a data structure based on the identity group, identity identifier and/or group identifier assigned to the respective event dataset. By storing the event datasets an increasing level of detail information can be acquired per entity. The precision of the processing component to assign an event dataset to an identification group can scale based on the number of event datasets in the respective group.

The database module can be an object relational database management system. In particular, the database module can be a PostgreSQL database. The database module can be part of a database management system. An object relational database can achieve the advantage of increased reliability, stability, scalability as well as security.

The database module can be configured to generate context data which comprises information on assigning a tracking identification to an identification group. The context data can, for example, comprise visited and/or opened webpages (URLs) and/or product related data. According to an advantageous embodiment the database module can store processed and/or anonymized event datasets. Furthermore, the database module can provide context data to the processing component, which can assign a new event dataset to an identification group based on the provided context data. The database module can also provide the context data to a machine learning module, wherein the machine learning module can process the context data to increase the precision of matching an event dataset to an identification group. The context data can comprise information regarding the base similarity of an assigned event dataset and the respective identification group. In particular, each event dataset can be assigned a similarity indicator which signifies the quality of the match of an identification group and a respective event dataset. The similarity indicator can scale proportional to the match of the event dataset to the parameter ranges covered by the respective identification group.

The database module can be configured to achieve linear CPU scalability. Furthermore, the database module may achieve the advantage of an increased data extraction speed, data insertion speed, data upload speed and/or searching speed, in particular in comparison to a regular SQL database.

The database module can be configured to generate the context data based on the event dataset. The context data can be provided per identification group and/or per event dataset. Context data can be used by the machine learning module to learn rules regarding entity actions and resulting event datasets. Thus, the machine learning module can learn to trace user actions based on event datasets. In particular, the machine learning module can match a plurality of event datasets, in particular a sequential set of event datasets to an overarching entity action (i.e., searching a category, viewing detail pages, adding an item to a shopping cart etc.).

The processing component can be configured to receive the context data provided by the database module. This may achieve the advantage that assigning an event dataset to an identification group can be based on the context data of previously captured event datasets.

The processing component can comprise a representational state transfer (REST) interface module, in particular a REST application interface module (API), configured to provide a communication interface to a receiver node. The interface can achieve the advantage of providing tracking data for a plurality of entities. Furthermore, the interface can function as a gateway to access the tracking data stored within the database module and/or the tracking data processed instantaneously by the processing component. Thus, the REST module can achieve the advantage of providing live tracking data pertaining to an active session of a specific entity. The REST module can read event datasets from an event dataset queue provided by an event data module, in particular a REDIS Job-Queue.

The processing component and in particular the REST interface module can form a central analysis backend for event data evaluation. Via APIs, the event datasets of connected platforms can be pulled into the processing component, so that a holistic picture of sales channels and marketing channels is created. The REST interface achieves the advantage of increasing efficiency of data control of the tracking functionality. The API can provide an interface to a variety of analysis node types. An analysis node, respectively receiver node, can be a business intelligence interface, QlikView, Tableau, Google DataStudio, a mobile device application and/or a website.

The processing component can be configured to generate analytical data, preferably pageview data, based on the assigning of a tracking identification to an identification group. The analytical data can comprise information pertaining to trends, patterns, intentions, projections, action anticipations regarding a specific entity, a group of entities, an identification group etc. Furthermore, the analytical data can comprise visualizations, monitoring data, reporting data, integration data regarding a specific event dataset, a plurality of event datasets assigned to a specific identification group and/or a plurality of identification groups each comprising a plurality of event datasets and each representing a specific entity. The analytical data may represent an evaluation of an entity towards predetermined objectives set by a receiver node of the analytical data. In particular, the processing node can be configured to measure a success rate of a set of event datasets on the basis of a received analytical objective. For example, the analytical data may evaluate the likelihood of the entity completing a purchase, returning to the platform etc.

The System can comprise a receiver node configured to receive analytical data. In particular, the receiver node can be configured to access the API to request analytical data. Event data, in particular in form of tracking data based on the identification groups can be accessed by the receiver node. Preferably, any data available to the processing component can be accessed by the receiver node. The receiver node can be prevented from accessing non-anonymized event data. The receiver node can be a central analysis backend for processing and evaluating event datasets.

The processing component can be configured to provide analytical data to the receiver node, in particular upon request by the receiver node. This may achieve the advantage that the receiver node can initiate a data update and that the transfer of analytical data and/or tracking data is processed more efficiently.

The analytical data can comprise at least one data element of the following data element categories:
platform interaction data of an entity;
finger print data uniquely identifying a specific entity;
advertising interaction data:
cross-domain tracking data;
cross-site tracking data;
cross-device tracking data;
cross-session tracking data.

Platform interaction data can comprise data pertaining to interactions with visual elements presented to the entity. Interacting with the visual elements by the entity may create a data trace at the platform interface which can be comprised in the event dataset. Advertising interaction can pertain to advertising elements displayed to the entity on the platform.

The platform can be a software module configured to process data request entered by the entity. The processing component can be configured to identify an entity during an active communication session based on a previously received and/or generated finger print data. This identification can be performed in real time while the event datasets are sequentially processed. When the processing component establishes an identification of the entity current event datasets can be linked to previously recorded event datasets. This can be achieved by assigning incoming event datasets to an identification group which represents the entity and/or comprises the previously recorded entity datasets. The previously recorded entity datasets can be stored in a truncated, in particular anonymized form. Additionally or alternatively, the event datasets can be stored in a hashed form to prevent third party identification based on knowledge of the assigned identification group.

The analytical data can comprise at least one data element of an entity footprint, hardware footprint, script footprint and/or an action footprint. Such a data element can be audio device data, canvas data pertaining to display settings, contrast data pertaining to a display, CPU class and/or CPU type data, hardware concurrency data pertaining to a number of concurrent threads supported by the implementation, available memory data, available storage space data, domain blocker data pertaining to whether an advertisement blocking software is installed, language settings data, platform information data pertaining to the software platform the entity session is initiated on, device operation system data, browser information data, browser version data, time zone data, installed plugins data and/or manufacturer hardware data. The analytical data can generally comprise any available entity device parameter.

The system can comprise an event data module configured to receive and store event datasets. Preferably the event data module can be a Redis store module. The event data module can be provided separate from any other module, in particular separate from the processing component. Also, the database module can be provided as an external module. Preferably, either module can be provided by a software as a service provider, respectively database as a service provider.

The event data module can be an in-memory data structure store comprising a distributed, in-memory key-value database, cache and message broker. The in-memory data structure store can achieve the advantage of increasing the speed of transferring tracking events, respectively event datasets from gate module, preferably a plurality of different gate modules, to any number of receiver nodes. The receiver nodes can be configured as microservices.

The event data module can be a stack and can be configured to provide event datasets to the processing component, in particular as a sequential queue of event datasets. The stack can preferably be configured as a FIFO-stack or LIFO-stack. Based on a FIFO-stack the processing component can receive the event datasets in chronological order. Depending on the depth of the stack, a LIFO stack can be preferable to process the most recent entity action and generate an adequate response at the platform.

The gate module and/or the event data module can be configured to anonymize the event dataset. This achieves the advantage that the processing component already handles anonymized datasets. Thus, the event data module may receive a raw event dataset, anonymize the event dataset and place it into a stack or queue to be processed by the processing component. The processing component may then assign a group identifier to the event dataset based on a machine learning model. This association can be stored in conjunction with the event dataset and/or the respective tracking context (i.e., visited URLs, product information, etc.). Preferably, the gate module anonymizes the event data. In particular, the DNS reverse proxy and/or the beacon module can be configured to anonymize the event dataset.

By anonymizing the event data at the event data module an additional barrier can be created which hinders unauthorized tracing of an entity and/or retrieve personal or private information of an entity. The anonymization may not hinder the unique and unambiguous association of an event dataset to a group identifier, respectively the corresponding identification group.

Anonymizing can comprise at least one of the following:
  selecting a subset of entity identifiers as an event dataset;
  removing a subset of entity identifiers from an event dataset;
  obfuscating an entity identifier;
  hashing an event dataset and/or at least one entity identifier;
  truncating an event dataset and/or at least an entity identifier;
  scrambling at least part of an event dataset and/or at least part of an entity identifier.

The event data module is configured as a software service. Thus, the event data module can be executed on a separate hardware or virtual instance.

The event data module can be configured to process the event dataset and to generate a reduced dataset based on the event dataset and provide the reduced dataset as an event dataset to the processing component. The reduced dataset can be consistent with the parameter space covered by the available identification groups. For example, parameters which are not used to determine an identification group for a respective event dataset can be removed. Thus, the dimensionality of the identification groups can be smaller than the dimensionality of an event dataset. The event dataset can be even further reduced to exclude parameters considered non-essential for generating analytical data and/or identifying a specific entity.

The reduced dataset comprises entity identifiers in compliance with a set of data privacy rules. This achieves the advantage that a handling of entity data may conform to data privacy laws. In particular, the event dataset can be reduced such that no further consent of the entity itself is necessary for further data handling.

A gate module and/or the event data module can be configured to request an entity authorization regarding event dataset handling. The event data module and/or the gate module can be configured to act as an event data handler across a plurality of platforms. Thus, a single authorization of the event data module and/or the gate module by the entity can authorize event data handling for a plurality of platforms. Thereby, the event data module or the gate module may achieve the advantage that the entity only needs to consent once to the handling of event data and not per platform, webpage session or device.

The reduced dataset can comprise a set of entity identifiers configured to represent the entity independent from at least one of the following:
  the device the event dataset is captured on;
  the provider of the event dataset, in particular independent of the client hardware, client services, server hardware and/or server services;
  the time of capture of the event dataset;
  the unique network identifier (i.e., IP-address. MAC-address).

The processing component can comprise the event data module.

The processing component and/or the event data module can be configured to generate the plurality of identification groups such that each pair of two groups of the plurality of groups is spaced apart by at least a predetermined proximity threshold value within the parameter range for a selected entity identifier. This may achieve the advantage of generating a sparse distribution of identification groups. Thus, the probability that an event dataset can be assigned to an identification group in error is reduced. In particular, the distribution can be made sparse in such a way that an event dataset is assigned to an existing identification group when a similarity between the event dataset and the group falls below a similarity threshold value. When the similarity threshold value is exceeded, meaning the identification group and the event dataset are dissimilar, a new identification group can be created by the processing component based on the respective event dataset. The similarity threshold value can be based on a proximity threshold value within the parameter space populated by the identification groups.

The processing component can be configured to merge groups, when a group proximity threshold value is undercut. Due to an initially coarse representation of an entity based on only a small number of event datasets there may exist separate groups which may represent one true entity. With an increasing number of available and assigned event datasets the group proximity threshold value can be undercut and the groups merged to represent one entity. A group may expand due to event datasets being assigned based on a majority of parameters matching the parameter brackets of the group, wherein a minority of parameters do not match and indirectly expand the parameter bracket assigned to that group.

The processing component and/or the event data module can be configured to generate one group per unique entity. This may achieve the advantage of tracing an entity in a unique and unambiguous fashion, when event datasets can be assigned to a respective group. A set of event datasets can be identified based on the time interval between event datasets. When a timing threshold value is exceeded, a new set can be registered (i.e., a new session). Event datasets within a set of event datasets have an increased probability to belong to the same entity. Thus, the processing component can assign a set of event datasets based detecting a cohesive session.

Each identity identifier can be a parameter of an identification parameter space and the processing component and/or the event data module can be configured to generate non-intersecting identification groups within the parameter space. This may achieve the advantage of reducing or preventing ambiguous and/or non-deterministic identification group assignments of event datasets.

The processing component can be configured to assign an event dataset to an identification group when at least one entity identifier of the event dataset falls within a corresponding value bracket for that entity identifier and the corresponding value bracket is assigned to the identification group. The identification group can be represented by the group identifier and the event dataset can be represented by the tracking identification. Thus, a plurality of tracking identifications can be assigned to a group identifier. This achieves the advantage that the tracking can be realized purely based on assigning identifiers and not handling any entity identifiers—specifically any raw data elements from the event dataset. Any tracking association can be anonymized and/or non-traceable regarding personal information of an entity. The definition of an identification group based on entity identifiers can be limited to a communication between the processing component and the node and/or the processing component and the evet data module. Thus, the system can create an information barrier towards receiver nodes. In particular, any analytical data provided to the receiver nodes may identify unique entities but can in particular be void of personal entity information. This achieves the advantage of being compatible with existing data privacy rules.

The processing component can be configured to set a priority order of entity identifiers and to assign an event dataset to an identification group based on the priority order of the entity identifiers comprised within the event dataset. This may achieve the advantage of an indirect weighting of the parameters and achieve a deterministic assignment process of an event dataset to an identification group. Alternatively and/or additionally, the entity identifiers can be matched in parallel to the identification process to speed up the assignment process of matching the event dataset to an identification group.

The processing component can be configured to assign the event dataset to an identification group based on the entity identifier with the highest priority. Furthermore, the processing component may add further entity identifiers, in particular following the sequence defined by the priority order to assign the event dataset to an identification group. The assignment process can be completed when a sufficient match is achieved. A sufficient match can be defined as a set of entity identifiers falling within the respective parameter brackets of these entity identifiers of a respective identification group.

The processing component can be configured to uniquely assign an event dataset to an identification group when the event dataset comprises a first entity identifier having a value within a first value bracket assigned to a first group and comprises a second entity identifier having a value within a second value bracket assigned to a second group.

The processing component can be configured to uniquely assign the event dataset to the first identification group when the first entity identifier has a higher priority than the second entity identifier.

The event data module can be an in-memory database management system configured to use primary memory, in particular random-access memory to store event datasets. This may achieve the advantage of increasing the speed of storing and/or retrieving event datasets. In particular, the latency of requests can be advantageously reduced.

The processing component can comprise a machine learning module configured to generate a similarity measure of the tracking identification to an identification group of the plurality of identification groups and to assign the tracking identification to an identification group based on the similarity measure. The machine learning can be configured to increase its assigning speed, precision and/or match quality with an increasing number of available event datasets. The machine learning model can be configured to adjust parameter brackets of identification groups to increase the precision of the representation of the entity by the identification group. In particular, parameters, i.e., entity identifiers not used in the initial assigning process can be used to further expand the identification group. Additionally, the machine learning module may progressively increase the number of entity identifiers used in the assigning process.

The processing component can be configured to assign a value bracket for each entity identifier comprised within each identification group.

The processing component can be configured to select a set of entity identifiers to represent an identification group based on a set of data privacy rules. In particular, the entity identifiers can be chosen in such a way that retrieving and/or reconstructing personal information of the entity can be prevented or the probability of such a reconstruction reduced.

The event data module can be configured to provide a limited event dataset to the processing component, wherein the limited event dataset comprises a subset of entity identifiers of the identity identifiers comprised in the event dataset. In particular, the limited event dataset can be reduced to core entity identifiers relevant for assigning the entity dataset to an identification group. Any redundant, non-essential, or data privacy incriminating information can be disregarded, anonymized, encoded and/or encrypted.

The machine learning module can be configured to process the context information and base assigning the tracking identification to an identification group on the context information.

The machine learning module can be configured to increase a matching precision of the tracking identification to an identification group based on a plurality of event datasets.

The machine learning module can be configured independent from pre-set and/or predetermined rules. This may achieve the advantage that the machine learning module is free to develop and learn its own set of rules optimized to the actual input of event datasets. The machine learning module can be configured with parameter pattern analysis components which are configured to identify patterns across or within event datasets and to determine a measure of similarity based on the correlation of these patterns. Patterns can be determined across sessions, devices and/or platforms.

The machine learning module can be configured to be trained based on a plurality of event datasets. During the training process the true identity of an entity can be known to the system to provide a true basis for an initial set of identification groups.

The machine learning module can be configured to learn correlations based on a plurality of event datasets.

The machine learning module can be configured to generate a set of rules based on learned correlations, wherein the set of rules determines the assigning of an event dataset to an identification group. The identification group can be represented by a group identifier and the event dataset can be represented by an entity identifier. The machine learning module can be configured to group entity identifiers as an identification group wherein the identification group can be accessed via the group identifier. Tracking an entity via the entity identifier and group identifiers achieves an additional layer of security against unauthorized identity tracing and protect entity identifiers.

The machine learning module can be configured to match event datasets received from at least two nodes to a single entity. This may achieve the advantage of cross-device tracking. Each device can be represented by a node. The processing component can be configured to identify an event dataset matching or being similar to a previous event dataset. In particular device independent entity identifiers can be used to track an entity across devices.

The single entity can be represented by a unique tracking identification. The tracking identification may obfuscate the true identity of the entity. The tracking identification may further identify a single cohesive session comprising a plurality of entity datasets.

The single entity can be represented by a unique group identification. The tracking identification can be associated to a single event dataset, a single event session, i.e., on a specific device, within a cohesive time interval and/or at a specific platform. The group identification may span across a plurality of event session, i.e., originating from different devices, spanning a plurality of cohesive time intervals and/or spanning a plurality of specific platforms. The tracking identification may identify an entity within a specific session and/or a limited time interval, wherein the group identification The machine learning module can be configured to project an event dataset onto a learned correlation to identify the event dataset as an entity action. Projecting an event dataset can comprise the process of fitting a specific event dataset within a timeline of logically linked entity actions (i.e., noticing an item, researching the item, viewing detailed information on the item, placing the item in a shopping cart and/or completing a purchase of the item). Herein the item can be researched and/or viewed across multiple platforms (price comparison websites, shopping platforms, social media websites, adds). Each event dataset can be projected onto an action and/or intent of the entity. Based on such a projection the event dataset can be assigned to an identification group, thus uniquely tying the event dataset to a specific entity, respectively an entity representation in form of the identification group, in particular with a group identifier.

The processing component can be configured to identify and track item related interactions of a specific entity. In particular, the event dataset can comprise interaction data pertaining to the type of element the interaction relates, i.e., what type of advertisement is interacted with. Thus, the processing component can be configured to assign an effectiveness score to a specific type of advertisement based on the interactions with the specific type of advertisement by a plurality of entities. In particular, such an effectiveness score can be generated across a plurality of entities by processing a plurality of identification groups, wherein each identification group comprises at least one event dataset associated with the specific type of advertisement. Furthermore, the processing component can be configured to provide a cross correlation of a plurality of advertisement types to identify an advertisement type with the highest effectiveness score. The effectiveness score can be provided as tracking data, respectively analytical data.

The machine learning module can be configured to generate meta data based on identifying the entity action. The meta data can be linked to the event dataset labelling the entity action. This achieves the advantage of identifying the intent of an entity based on the event datasets.

The machine learning module can be configured to include the meta data to the event dataset.

The processing component can be configured to generate tracking data for an entity, wherein the tracking data comprises at least one of the following:
  a set of entity actions;
  a plurality of event datasets;
  a time series of event datasets or entity identifiers;
  a location series of an entity.

The processing component can be configured to generate the tracking data for an entity based on a plurality of event datasets assigned to a specific identification group representing a single entity. This may achieve the advantage, that the processing component can trace an entity independent of device and time constraints. The entity might pause a specific action and continue at a different point in time and/or on a different device. The processing component may trace the entity across sessions and across devices based on linking the event datasets originating from different sessions and/or different devices to the same identification group. Thus, cohesive tracking data for an entity can be provided without breaks created by switching devices and/or ending and starting sessions.

The processing component can be configured to provide tracking data related to a specific entity to a receiver node. The receiver node may execute an application, in particular a mobile application to access the tracking data. Additionally or alternatively, a business intelligence dashboard can be provided by the receiver node to manage accessing the tracking data. Furthermore, the node can execute a browser plugin to access and display tracking data. The tracking data can be integrated into a platform dashboard accumulating platform data and tracking data, wherein the platform data can comprise internally available item data (i.e., active advertisements, stock level of items, shipping information, entity databases etc.).

The system can comprise a receiver node configured to request tracking data for an entity or a plurality of entities from the processing component.

The processing component can be configured to weight the entity identifiers and assign the tracking identity corresponding to the weighted entity identifiers to an identification group on the basis of the weighted entity identifiers. In particular the machine learning module may adjust the weights based on the correlation of an event dataset to a specific identification group. Thus, the matching of subsequent event datasets to an identification group can achieve a higher correlation and thereby higher confidence of the event dataset being correctly assigned.

The system can comprise a gate module configured to capture interaction events and to generate the event dataset based on the interaction events. The gate module can achieve the advantage of directly communicating with the event data module to forward and process event datasets. The gate module can be configured to standardize the format of event datasets to increase efficiency of the processing of the event datasets at the event data module. Interaction events can be defined as an entity interacting with a platform via a node, i.e., a device.

The gate module can comprise a reverse proxy server, in particular a DNS reverse proxy server, configured to receive entity queries and forward the entity queries to a server. The DNS can be configured to route incoming requests to a proxy instead of the server. Thus, the requests can be used as entity identifiers within an event dataset. The reverse proxy server can be transparent to the entity and/or require a single authentication.

The gate module can be configured to generate the event dataset based on the entity queries.

The system can comprise a node configured to capture an entity input and/or the gate module can be configured to generate the event dataset at least partly on the basis of the entity input received by the node.

The node can comprise an input device, configured to capture an entity input sequence, and wherein the node is configured to provide the input sequence to the gate module as an entity identifier within an entity dataset.

The processing component can be configured to determine an input pattern based on the input sequence and to assign the event dataset to an identification group based on the determined input pattern. Thus, the entity can be identified based on a characteristic input pattern. For example, a characteristic mouse gesture, specific delay between key strokes or a characteristic swipe pattern can be recognized by the processing component and used to track an entity. The processing component may process the entity input sequence based on pattern recognition algorithms.

The gate module and/or the node can be configured to execute a platform application and configured to capture platform interactions at the platform application and to generate an event dataset based on the captured platform interactions.

The system can comprise a beacon module configured to receive an event dataset, in particular receive the event dataset from the node, and to forward the event dataset to the gate module.

The gate module can comprise a content server [server-side tracking] configured to receive entity requests based on an entity input and to generate at least part of the event dataset based on the entity request.

The content server can be configured to execute a platform application [Customer store] and configured to capture platform interactions at the platform application and to generate an event dataset based on the captured platform interactions.

The gate module can be configured to anonymize the event dataset and provide the anonymized event dataset to the event data module.

The event data module can be configured to anonymize the event dataset and provide the anonymized event dataset to the processing component.

The gate module can be configured to receive event datasets from a plurality of nodes.

The node can be configured to generate attribution data. Additionally and/or alternatively, the processing component and/or the machine learning component can be configured to generate attribution data. The attribution data can be generated based on a statistical or dynamical event-based attribution model. An attribution value can be assigned to each interaction by the entity with a platform represented by an event dataset. The attribution value can indicate a measure of significance of the respective entity dataset to reaching a positive final action, i.e., a completed purchase.

The gate module and/or the event data module can be configured to generate the event dataset at least in part based on the attribution data.

The system can comprise a tracking manager module configured to receive the event dataset and to forward the event dataset at least partly and/or a subset of entity identifiers to a third-party service.

The tracking manager module can be configured receive a third-party identifier. The third-party identifier can in particular be a tracking pixel.

The tracking manager module can be configured to process the third-party identifier based on an entity action.

The tracking manager can be configured to pass event datasets to a platform server. The tracking manager can be configured to provide the event datasets encrypted, anonymized and/or void of entity identifying data (i.e., personal data). The tracking manager can be comprised within an interface representation of the platform (i.e., a platform website) and/or act as the sole source for tracking data. Any third-party tracking code (i.e., Google Analytics) is comprised within the tracking manager module and passed from the tracking manager module to the platform server. This can achieve the advantage of tracking an entity without a cookie consent and providing a uniform tracking data interface for a plurality of tracking sources.

The tracking manager module can be configured identify an entity based on a third-party entity profile linked to the third-party identifier.

The tracking manager module can be configured to provide entity identification data to a third-party identification server based on an entity action performed in conjunction with processing the third-party identifier.

The event dataset can comprise at least one of the following key data elements:
- purchase data;
- shopping cart data;
- impressions data; (significant view time of an item)
- bookmark data; (item saved for later review).

Purchase data can relate to items for which the entity completed a checkout process on the platform and thus completed a purchase. Additionally or alternatively, the purchase data can relate to checkout items which may have been in the shopping cart, but deleted prior to purchasing a different item.

The processing component can be configured to separate at least one key data element from the event dataset.

The processing component can be configured to provide at least one key data element to a receiver, wherein the receiver is one of: the gate module, the node, the beacon module, the content server and/or the event data module.

This achieves the advantage that a key data element, in particular a key data element generated in a previous session, respectively previously captured event dataset can be restored within a different session of the same entity. As this restore is based on an entity tracking without any account information and/or login credentials the entity does not need to be logged in or provide any type of identification to the node and/or to the platform for the key data element to be restored, when the system identifies the entity based on the present interaction session, respectively based on the The receiver can be configured to restore a session data element within a session of an entity based on the received key data element. In particular, the key data element can replace and/or supplement the session data element. For example, items can be restored to the shopping cart and/or the platform server can provide set of items to be displayed to the entity to the node based on previously viewed, purchased and/or cart-added items.

The processing component can be configured to provide the at least one key data element when an event dataset from an active session at the receiver is assigned to an identification group which comprises a key data element by the processing component.

The processing component can be configured to provide the at least one key data element independent from at least one of the following:
- the device the event dataset is captured on;
- the provider of the event dataset, in particular independent of the client hardware, client services, server hardware and/or server services;
- the time of capture of the event dataset;
- the unique network identifier (i.e., IP-address. MAC-address).

The machine learning module can be configured to generate artificial event datasets based on a plurality of existing event datasets, wherein each dataset of the plurality of existing event datasets comprises a unique entity information such that each event dataset is assigned to a specific entity.

The machine learning module can be configured to generate a set of rules for assigning event datasets to a specific identification group based on the artificial event datasets and/or existing event datasets.

The machine learning module can comprise a generative network configured to generate the artificial datasets to train the machine learning module.

The machine learning module can comprise a reconstruction component configured to provide an estimate of an event dataset matching a specific entity.

The system can comprise an advertisement allocation module configured to manage exposure values of a plurality of advertisement elements. An exposure value may define a visibility of an advertisement, in particular across a plurality of advertising platforms.

The processing component can be configured to modify the exposure value for each advertisement of the plurality of advertisement elements. This can achieve the advantage of optimizing the return on an advertisement cost, as the processing component can determine which advertisement elements are most efficient on which platform and/or which advertisement types are efficient.

The node can be configured to display an advertisement element based on its exposure value.

The processing component can be configured to determine and/or modify an exposure value based on processed entity datasets such that the exposure value of each advertisement element scales proportional to its effectiveness, wherein an advertisement effectiveness can be determined by the processing component on the basis of event datasets corresponding to entity interactions with the respective advertisement element.

The processing component can be configured to determine an exposure value in relation to the platform the respective advertisement is placed on and/or viewed on by an entity, such that the advertisement display can be optimized across platforms.

The processing component can be configured to determine an efficiency ratio of advertising cost and advertising volume and/or advertisement type based on the event datasets.

The processing component can be configured to modify an exposure value of an advertisement element based on the efficiency ratio.

The processing component can be configured to assign a fractional impact value to each event dataset and/or to each entity action comprising a plurality of event datasets, and wherein the fractional impact value defines a probability of the respective event dataset and/or entity action to lead to a purchase of an item by the entity.

The processing component can be configured to track an interaction of an entity with an advertisement element based on the event datasets, comprising at least one of the following event parameters:
- time interval spent by the node and/or entity on a webpage;
- number of pages accessed by the node and/or entity;
- time spent displaying media by the node;
- scrolling distance, in particular scrolling distance per webpage;
- progress within a defined entity action, i.e., progress of a purchase;
- starting of a checkout process;
- time interval between a current interaction session and a previous interaction session with the same platform.

The processing component can be configured to assign a significance value to an advertisement element based on the event dataset.

The processing component can be configured to categorize an entity interaction based on the event dataset into an entity action category, wherein the entity action category is one of the following:
- attention action;
- interest action;
- desire action;
- purchase action;
- initializer action;
- holder action;
- closer action.

These entity action categories can be based on a linear, sequential model built on an assumption that users move through a series of cognitive and affective stages culminating in a behavioral stage (i.e. placing an item in the shopping cart, researching an item, purchase an item etc.). The attention action can indicate the entity becoming aware of a category, product or brand, in particular by interacting with an advertising element. The interest action can relate to further inquiries of the entity regarding a specific item, item category, item property and/or platform. The desire action can indicate a specific relation, in particular a favorable relation of the entity towards a specific item, item category, item property and/or platform. The purchase action can relate to the entity forming an intention to purchase or to actually purchasing an item or service. The initializer action can represent an awareness of the entity towards a specific item and/or platform, Additionally or alternatively, the initializer action can indicate an initial exploration of the entity towards a specific item and/or platform. The holder action can represent a continued attention and/or interest of the entity towards a specific item and/or platform. The closer action can represent a checkout phase or any combination of actions aimed at closing a transaction and/or session.

The processing component can be configured to determine an impact of each event parameter on the probability to complete a purchase and/or configured to weight the event parameters based on this impact of the respective parameter.

The processing component and/or the machine learning module can be configured to detect a break within an entity interaction based on a set of entity datasets and to generate meta data indicating the break (i.e., a break within an entity interaction can be indicated by a set of event datasets indicating an intent to purchase, but the purchase is not completed).

Through the collected and accurate event datasets, the processing component can be configured to generate an advertisement budget, in particular based on an amount of allocated funds and/or available advertisement elements. The processing component can provide an advertisement element distribution as analytical data to the receiver node, wherein the advertisement element distribution comprises information pertaining to which combination of advertisement element and advertisement platform is efficient to generate a maximum of purchase actions and/or closer actions. This achieves a more effective placement of advertisement elements with a higher relevance to the respective entity. As the process of gathering event data and modelling an advertisement placement is automated the advertisement element distribution can be provided and/or updated instantly. Thus, a higher speed of advertisement element distribution and placement can be achieved.

Furthermore, the system can achieve the advantage of replacing an operational media buyer module configured to manage advertisement accounts.

As the processing component is receiving event data from a plurality of platforms and/or advertisement channels the processing component can be configured to provide an automatic advertisement channel management entity action set representing a customer journey. Thereby, the efficiency of advertisements can be increased. In particular, a cross-platform customer journey can be initiated by targeted add placement and corresponding tracking. For example, an advertisement element can be placed on a social media platform and a closing action can be initiated by further guided advertisement on a search platform, via interaction with a newsletter. This the system achieves the advantage of data driven attribution of advertising elements to entity actions, in particular across platforms and/or sessions.

The system can attribute an impact value to each touchpoint of a customer journey, i.e., representing a sale. The system can be configured to determine an add efficiency based on the plurality of impact values and the final result (i.e., sale completed, session abandoned etc.) and to remove or place advertisement elements based on the add efficiency (i.e., place additional advertisements, increase the visibility of advertisements and/or remove advertisements etc.).

The processing component can be configured to extract at least one of the following meta data elements from an event dataset or a plurality of event datasets:
- time interval spent on a specific webpage;
- number of visited webpages;
- amount of media content consumed;
- scroll depth, in particular per page;
- progress within a specified entity action;
- initiating a purchase process;
- time interval between current session and previously captured session;
- time interval between last recorded interaction and a completed purchase action.

Based on these meta data elements the processing component can be configured to determine a value of an interaction and/or can be configured to divide a sequence of events according to determining an entity event category of a set of event datasets. Each interaction can have a specific value for the later purchase. The system can achieve the advantage that each specific interaction value can be measured across platforms, advertisement channels and determine an advertisement budget allocation accordingly.

The processing component can be configured to determine a distance, in particular, measured in entity actions, of the current event dataset stream to end in a purchase action. In particular, the processing component can be configured to determine a purchase probability which describes the likelihood of the entity completing a purchase action. The processing component can be configured to determine a purchase probability per item and/or per entity. Thus, achieving a platform-wide estimation.

The processing component and/or the machine learning module can be configured to generate item data (i.e., advertising texts, advertising images, product displays etc.) based on tracking an advertisement element and evaluating the impact of the advertisement element on a completed purchase of an item.

Thus, the processing component and/or the machine learning module can be configured to automatically generate sales texts. Based on the tracking data available via processing the event datasets the processing component and/or the machine learning module can determine which sales copy, respectively which advertisement performs particularly well. The machine learning module can deduce the contexts, which yield a high conversion of initial actions to a purchase action and thereby automatically create and test new advertisement elements. The processing component can generate content for each instance of the customer journey. For example, the processing component may alter an initial advertisement, a product detail page and/or a checkout page.

The processing component can provide advertisement design instructions representing event-based alterations to advertising elements (i.e., advertising images, videos, product images). This can decrease the number of webpages visited by the entity and therefore decrease the time interval from a first visit to completing a purchase. Thus, data traffic can be reduced and the traffic that is created can be used more efficiently—only advertisement elements with a high conversion are used.

The processing component can also comprise a content creation module, in particular a neural network which can be configured to generate advertising elements according to determined optimizations automatically and also automatically integrate these altered advertising elements into a platform directly.

The processing component can be configured to identify event datasets with an impact value exceeding a specific impact value threshold. These identified event datasets can be provided as analytical data. Furthermore, the processing component can be configured to modify a placement of an interaction element (i.e., a button, an advertisement, a product placement, product information) on a platform to increase the number of event datasets exceeding an impact value.

According to a further aspect the present invention relates to a method for providing tracking data, the method comprising the steps of receiving an event dataset comprising a plurality of entity identifiers, generating a tracking identification [UTID] based on the entity identifiers; determining a similarity measure between the tracking identification and an identification group of the plurality of identification groups, and assigning the tracking identification to one of the identification groups based on the similarity measure.

The Method can comprise the step of encrypting the event dataset.

The method can comprise the step of assigning a group identifier [GUID] to each identification group.

The method can comprise the steps of determining a similarity measure between the tracking identification and each identification group of the plurality of identification groups and assigning the tracking identification to one of the identification groups based on the similarity measure indicating the greatest similarity between the tracking identification and the identification group.

The method can comprise the step of identifying an entity based on the tracking identification being assigned to a specific identification group.

The method can comprise the step of storing the event datasets with the assigned group identifier by means of a database module.

The method can comprise the step of generating context data which comprises information on assigning a tracking identification to an identification group.

The method can comprise the step of generating the context data based on the event data.

The method can comprise the step of receiving the context data provided by a database module.

The method can comprise the step of providing a communication interface to a receiver node by means of a state transfer interface module.

The method can comprise the step of generating analytical data based on the assigning of a tracking identification to an identification group.

The method can comprise the step of providing analytical data to a receiver node (105), in particular upon receiving a request by the receiver node (105).

The method can comprise the step of receiving and storing event datasets by means of an event data module.

The method can comprise the step of anonymizing the event dataset.

Anonymizing can comprise at least one of the following:
selecting a subset of entity identifiers as an event dataset;
removing a subset of entity identifiers from an event dataset;
obfuscating an entity identifier;
hashing an event dataset and/or at least one entity identifier;
truncating an event dataset and/or at least an entity identifier;
scrambling at least part of an event dataset and/or at least part of an entity identifier.

The method can comprise the step of processing the event dataset and generating a reduced dataset based on the event dataset and providing the reduced dataset as an event dataset, in particular to the processing component.

The method can comprise the step of generating the plurality of identification groups such that each pair of two groups of the plurality of groups is spaced apart by at least a predetermined proximity threshold value within the parameter range for a selected entity identifier.

The method can comprise the step of generating one group per unique entity.

Each identity identifier can be a parameter of an identification parameter space and the method can comprise the step of generating non-intersecting identification groups within the parameter space.

The method can comprise the step of assigning an event dataset to an identification group when at least one entity identifier of the event dataset falls within a corresponding value bracket for that entity identifier and the corresponding value bracket is assigned to the identification group.

The method can comprise the step of setting a priority order of entity identifiers and assigning an event dataset to an identification group based on the priority order of the entity identifiers comprised within the event dataset.

The method can comprise the step of assigning the event dataset to an identification group based on the entity identifier with the highest priority.

The method can comprise the step of assigning an event dataset uniquely to one identification group when the event dataset comprises a first entity identifier having a value within a first value bracket assigned to a first group and comprises a second entity identifier having a value within a second value bracket assigned to a second group.

The method can comprise the step of assigning the event dataset uniquely to the first identification group when the first entity identifier has a higher priority than the second entity identifier.

The method can comprise the step of assigning a value bracket for each entity identifier comprised within each identification group.

The method can comprise the step of selecting a set of entity identifiers to represent an identification group based on a set of data privacy rules.

The method can comprise the step of providing a limited event dataset to the processing component, wherein the limited event dataset comprises a subset of entity identifiers of the identity identifiers comprised in the event dataset.

The method can comprise the step of processing context information and assigning the tracking identification to an identification group based on the context information.

The method can comprise the step of increasing a matching precision of the tracking identification to an identification group based on a plurality of event datasets.

The method can comprise the step of generating a set of rules based on learned correlations, wherein the set of rules determines the assigning of a tracking identification representing an event dataset to an identification group.

The method can comprise the step of matching event datasets received from at least two nodes to a single entity.

The method can comprise the step of projecting an event dataset onto a learned correlation to identify the event dataset as an entity action.

The method can comprise the step of generating meta data based on identifying the entity action.

The method can comprise the step of generating tracking data for an entity, wherein the tracking data comprises at least one of the following:
 a set of entity actions;
 a plurality of event datasets;
 a time series of event datasets or entity identifiers;
 a location series of an entity.

The method can comprise the step of generating the tracking data for an entity based on a plurality of event datasets assigned to a specific identification group representing a single entity.

The method can comprise the step of weighting the entity identifiers and assigning the tracking identity corresponding to the weighted entity identifiers to an identification group on the basis of the weighted entity identifiers.

The method can comprise the step of capturing interaction events and generating the event dataset based on the interaction events.

The method can comprise the step of receiving entity queries and forwarding the entity queries to a server.

The method can comprise the step of generating event datasets based on the entity queries.

The method can comprise the step of receiving an entity request based on an entity input and generating at least part of the event dataset based on the entity request.

The method can comprise the step of executing a platform application, capturing platform interactions at the platform application and/or generating an event dataset based on the captured platform interactions.

The method can comprise the step of generating attribution data.

The method can comprise the step of generating the event dataset at least in part based on the attribution data.

The method can comprise the step of receiving the event dataset and forwarding the event dataset and/or a subset of entity identifiers to a third-party service.

The method can comprise the step of receiving a third-party identifier.

The method can comprise the step of separating at least one key data element from the event dataset.

The method can comprise the step of providing at least one key data element to a receiver, wherein the receiver is one of: the gate module, the node, the beacon module, the content server and/or the event data module.

The method can comprise the step of restoring a session data element within a session of an entity based on the received key data element.

The method can comprise the step of providing the at least one key data element when an event dataset from an active session at the receiver is assigned to an identification group which comprises a key data element.

The method can comprise the step of providing the at least one key data element independent from at least one of the following:
 the device the event dataset is captured on;
 the provider of the event dataset, in particular independent of the client hardware, client services, server hardware and/or server services;
 the time of capture of the event dataset;
 the unique network identifier (i.e., IP-address. MAC-address).

The method can comprise the step of generating artificial event datasets based on a plurality of existing event datasets, wherein each dataset of the plurality of existing event datasets comprises a unique entity information such that each event dataset is assigned to a specific entity.

The method can comprise the step of generating a set of rules for assigning event datasets to a specific identification group based on the artificial event datasets and/or existing event datasets.

The method can comprise the step of providing an estimate of an event dataset matching a specific entity.

BRIEF DESCRIPTION OF FIGURES

The present invention will now be described with reference to the accompanying drawings, which illustrate embodiments of the invention. These embodiments should only exemplify, but not limit, the present invention.

DETAILED DESCRIPTION OF FIGURES

It is noted that not all the drawings carry all the reference signs. Instead, in some of the drawings, some of the reference signs have been omitted for sake of brevity and simplicity of illustration. Embodiments of the present invention will now be described with reference to the accompanying drawings.

Figure 1:
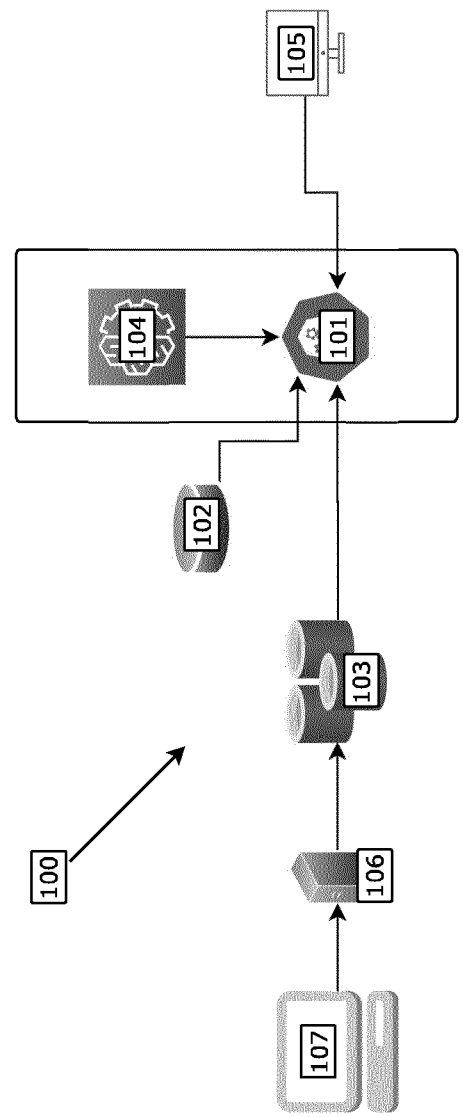
FIG. 1 schematically depicts a drawing of an embodiment of a tracking system according to the invention.

FIG. 1 shows a schematic representation of a tracking system 100 comprising a processing component 101, configured to receive an event dataset comprising a plurality of entity identifiers and to generate a tracking identification based on the entity identifiers. Furthermore, the processing component 101 can generate a plurality of identification groups based on a subset of entity identifiers and determine a similarity measure between the tracking identification and an identification group of the plurality of identification groups. Additionally, the processing component 101 can assign the tracking identification to one of the identification groups based on the similarity measure.

The backend of the system architecture consists of four components, each of which can be a separate module, in particular a Docker container and are interlinked as shown in FIG. 1. The processing component 101 functions as the core of the system, providing analysis data, in particular as a REST API. The processing component 101 can be a microservice that reads anonymized raw tracking data from an event data module 103, in particular from a Redis job queue, and can map the tracking data to a group identifier using a machine learning model 104. The results of this mapping can be stored in a database module 102, preferably a PostgreSQL database, along with tracking context (i.e., URLs called, product information, etc.).

The system 100 can further comprise the database module 103, in particular a Redis Store which can be configured to process the anonymized event datasets representing tracking events and can further be configured to provide context data for association, which can be used by the machine learning model 104.

The system 100 can further comprise a gate module 106 which can comprise an event server. An integrated anonymization component, in particular a Lua script, can be configured to perform the anonymization of the event dataset and transfers the anonymized event dataset to the event data module 103, in particular to a Redis job queue.

Preferably the event data module 103 is an in-memory database which can transfer tracking events in form of event datasets with increased speed from potentially different gate modules to an arbitrary number of microservices.

A front-end of the system can comprise any combination of the gate module (106), the beacon module (108), the node (107) and/or the content server (109). The front-end may represent a client-side reporting module which is configured to provide event datasets to the back-end of the system.

The system 100 can comprise a boot component, in particular in the form of a docker compose file, wherein the boot component can be configured to initialize the four base components: the processing component 101, the gate module 106, the event data module 103 and/or the database module 102. Furthermore, the boot component can be configured to bootstrap the system 100. The boot component can be provided in compiled form, preferably in the form of a Kubernetes or OpenShift module.

The system 100 can be configured to process any request or incoming event dataset via an API to connect to front-end components more efficiently. The API provided by the processing component 101 can adhere to a publicly known interface specification to enable standardized access to the processing component 101. Thus, interfacing with the processing component 101 can efficiently be inspected and tested.

The system 100 can comprise a receiver node 105, in particular a dashboard which can be configured to request analytical data from the processing component 101. The analytical data can comprise processed event datasets, context data and meta data, indicating an entity tracking and/or identified entity actions.

Figure 2:
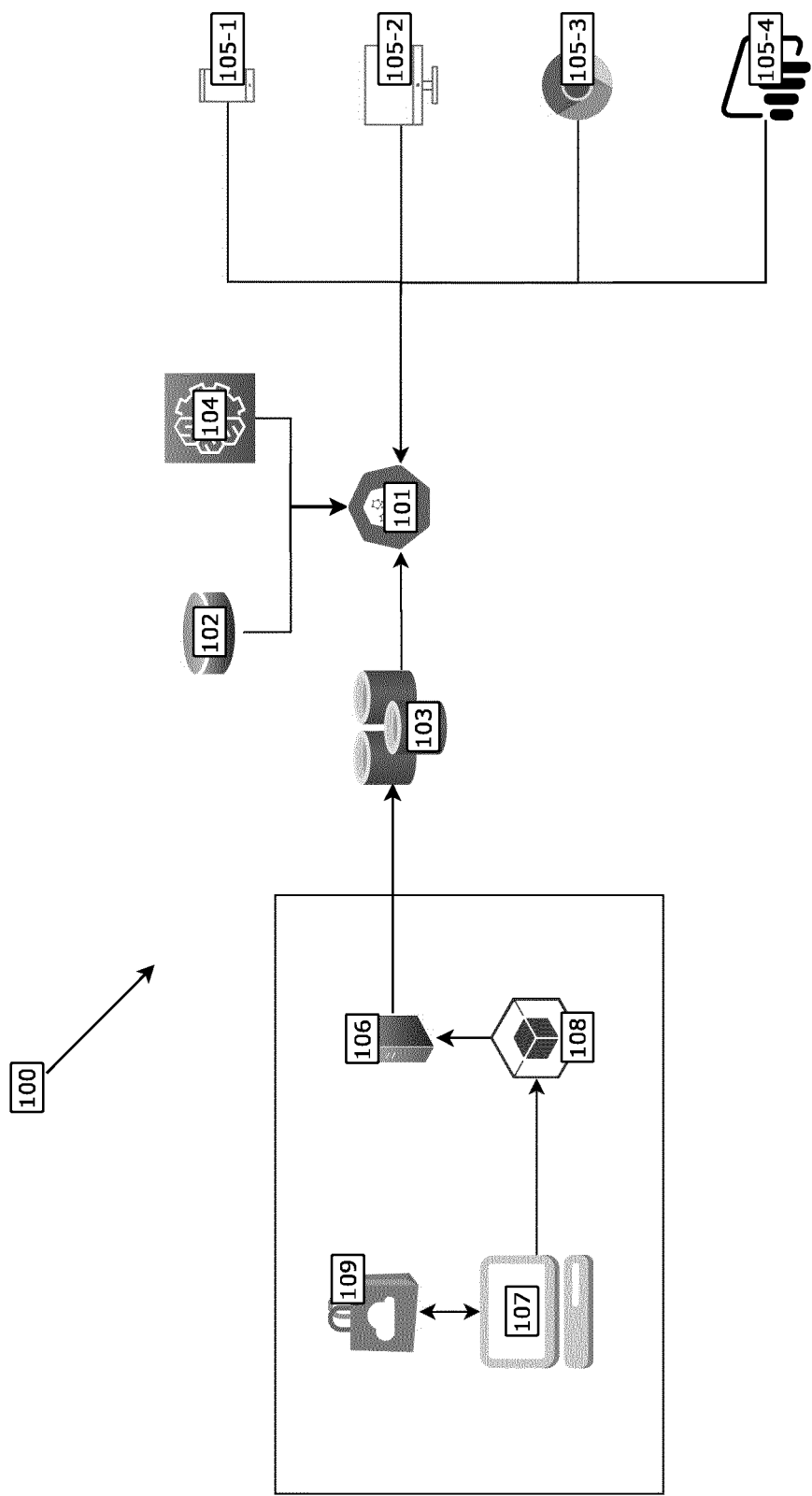
FIG. 2 schematically depicts an embodiment of a tracking system according to the present invention.

The system 100 can be configured to provide analytical data to a plurality of receiver nodes 105-1-105-4 according to the embodiment shown in FIG. 2. The receiver node can be an application 105-1, more specifically an application running on a mobile device and/or a dashboard application 105-2, i.e., plugin-type application running within or in conjunction with a platform process. Preferably the dashboard can be integrated into an analytics environment. Furthermore, the receiver node can be a plugin-type node 105-3, specifically a browser plugin configured to run as an extension to a web browser process and/or within the confines of a web browser application.

The system may further comprise a node 107 configured to capture an entity input which can form the basis of an event dataset generated by the gate module 106. The node can be configured to provide access to a platform 201 to the entity. The platform 201 can be a store-type or service-type interaction platform wherein the node provides a means to interact with the platform for the entity. A platform process may run locally on the node 107, within a browser on the node and/or streamed from a platform server. In particular, the node 107 can be configured to communicate with a platform server. Preferably, any interaction of the entity via the node with the platform can be captured by the gate module 106.

The system 100 can comprise a beacon module 108 configured to receive an event dataset, in particular, to receive the event dataset from the node 107, and to forward the event dataset to the gate module (106). The beacon module 108 can be integrated into the node 107. The beacon script can be a local process running on the node 107 and configured to communicate with the gate module 106. Hierarchically, the beacon script may process the entity actions in parallel to the communication with the interaction platform. Any interaction between the entity and the platform may also be captured by the beacon module and processed into an event dataset to be forwarded to the gate module 106.

Figure 3:
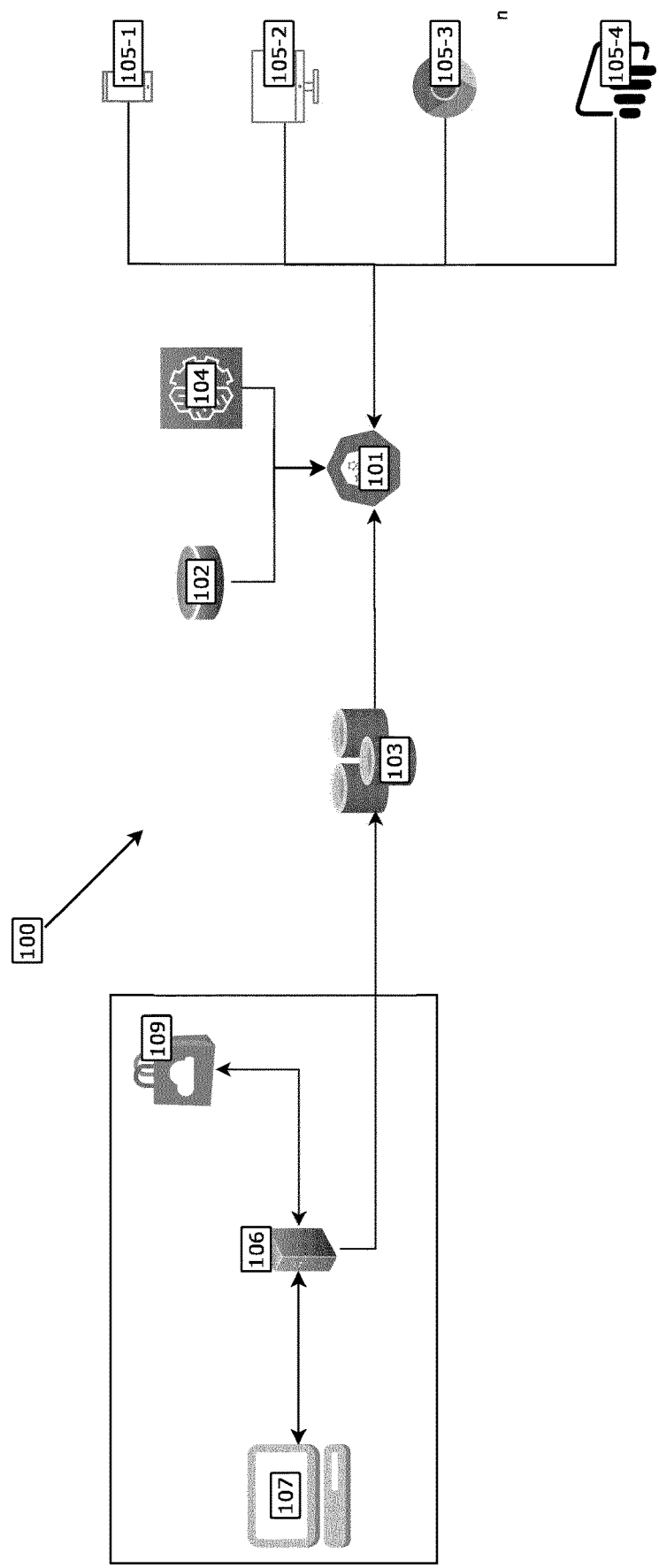
FIG. 3 schematically depicts an embodiment of tracking system according to the present invention.

According to further preferred embodiment as shown in FIG. 3 the gate module 106 can comprise a DNS reverse proxy. The DNS reverse proxy can be configured to function as an intermediary between the node 106 and the platform interface. The platform can be a content server providing a communication interface to the node. The DNS reverse proxy may receive a request, in particular a DNS request, from the node and forward the request to the content server. Based on the request the DNS reverse server can generate an event dataset.

Figure 4:
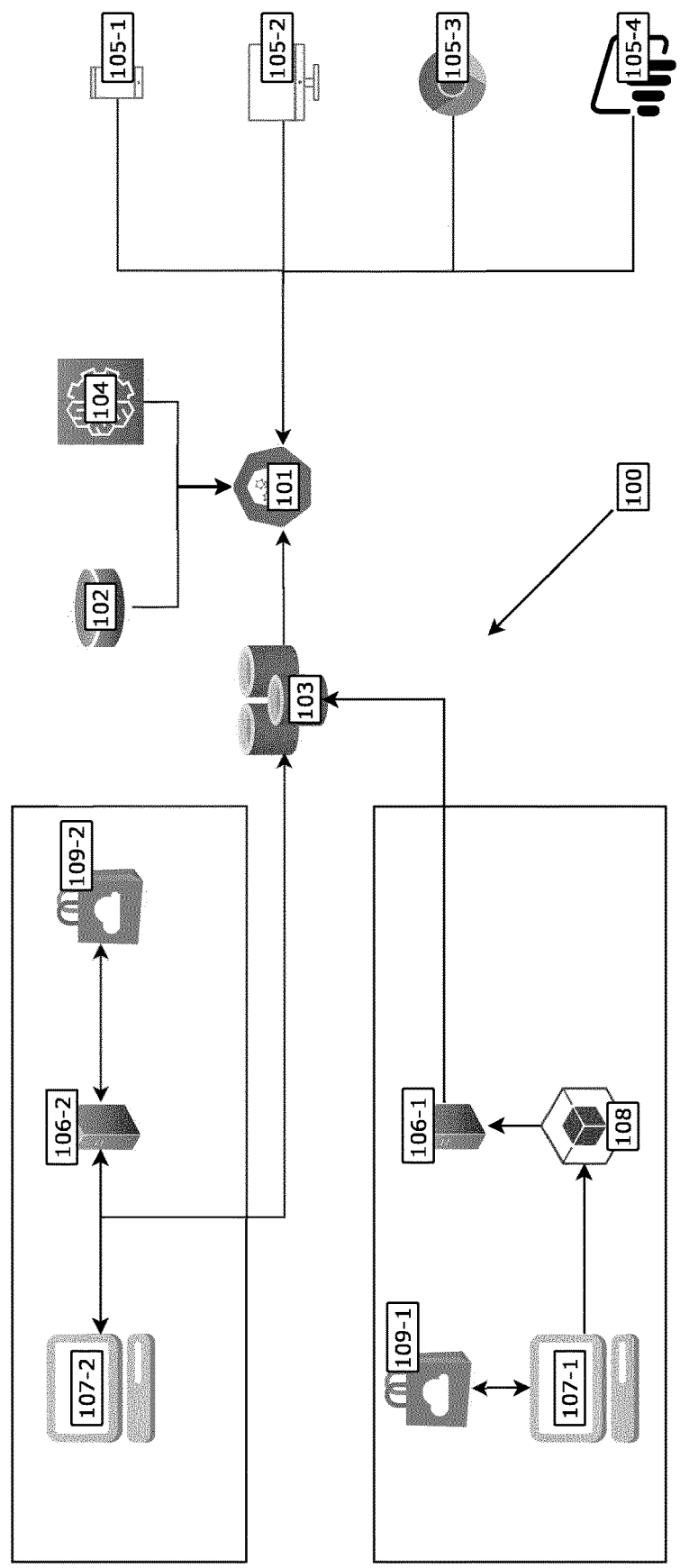
FIG. 4 schematically depicts an embodiment of a tracking system according to the present invention.

According to the embodiment shown in FIG. 4, the event data module 103 can be configured to receive event datasets either from a node-based event data capturing and/or from a server-based event data capturing. The event datasets can be provided to a central event data module 103. Thus, the advantage can be achieved that instances with client-side reporting or with server-side-reporting can be used to track an entity. Both configurations can be used in parallel and a preference to choose either system may depend on the configuration of the node, the configuration of the content server and/or bandwidth and latency properties of the communication sessions. For example, server-side event dataset generation can reduce the network traffic from the node 107.

The back-end can receive event datasets from a plurality of front-end modules. The front-end module can comprise any combination of the node (107-1), the beacon module (108), the gate module (106-1) and/or the content server (109-1). Such a front-end module can represent a client-side tracking. Additionally and/or alternatively, the front-end module can comprise any combination of the node (107-2), the gate module (106-2) and/or the content server (109-2). Such a front-end module can represent a server-side tracking.

Figure 5:
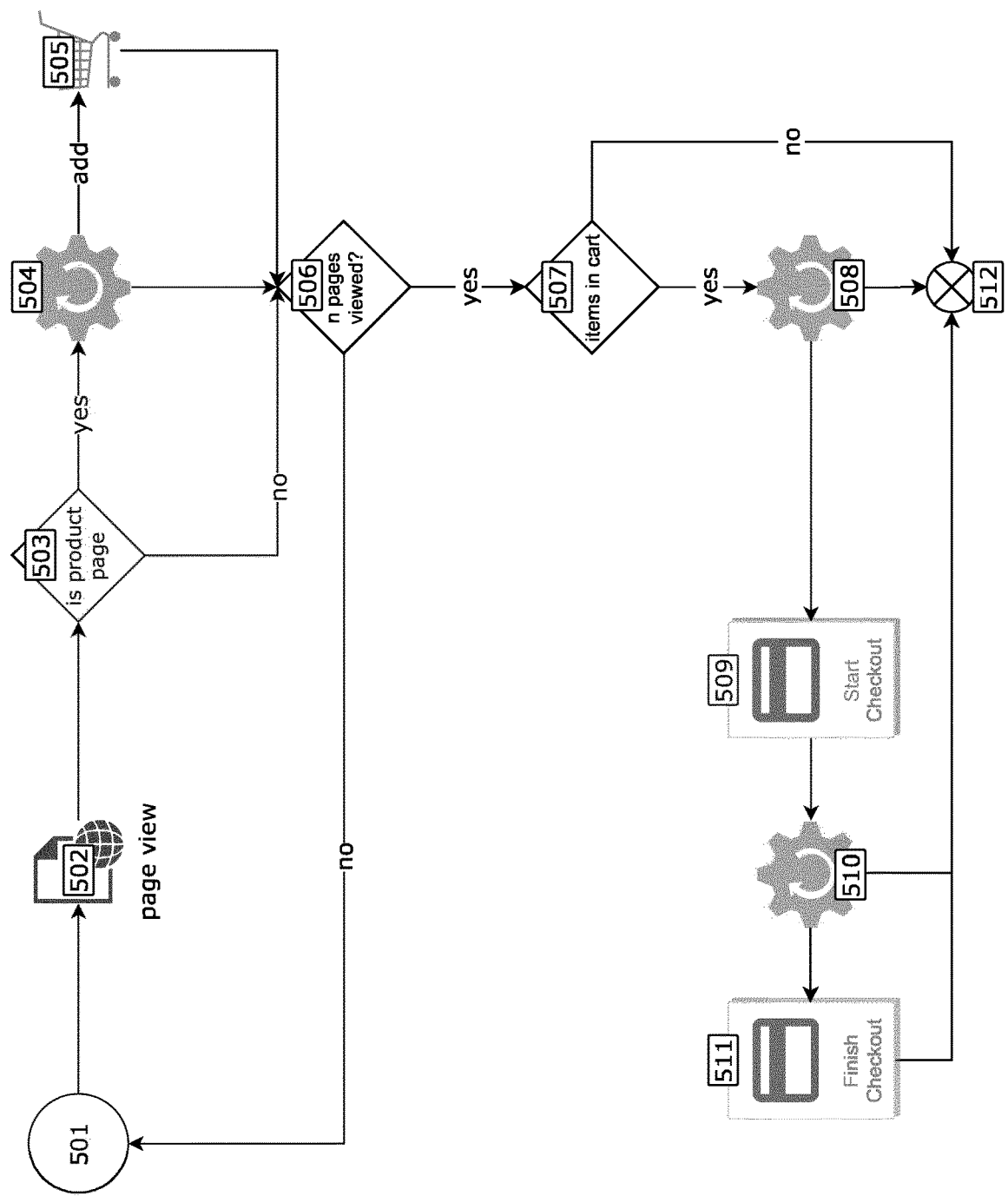
FIG. 5 schematically depicts an embodiment of a training method according to the invention.

FIG. 5 shows a generation method for the machine learning module 104 according to the invention. The method can comprise the step of generating 501 a unique entity, in particular by generating an entity identifier and generating a page view 502 associated to the entity. The method may further comprise determining 503 whether the page view is associated with a product page, i.e., the entity actually looked at a product. Based on determining that product page is viewed the method can comprise the step of generating 504 an add-to-cart probability, wherein when the add-to-card probability exceeds a predetermined threshold value the product associated with the product page can be placed in a cart. Thus, the method can comprise placing 505 an item in a cart based on the add-to-cart probability.

When the add-to-cart probability threshold is not exceeded the current iteration may end and another iteration of the loop can be initiated until a predetermined number of page views are queried. Thus, the method can comprise determining 506 if n pages have been viewed. In particular, the condition can be checked for a range of page views (1-$x$). Furthermore, the method can comprise determining 507 if items are in the cart. When items are in the cart the method can comprise generating 508 a start checkout probability. When the checkout probability exceeds a predetermined threshold value the checkout can be initiated. Thus, the method can comprise the step of initiating 509 a checkout process. When the checkout is initiated generating 510 a checkout completion probability can be performed. When exceeding a checkout completion threshold the method can comprise the step of completing 511 the checkout. The method can comprise generating 512 an event dataset or a plurality of event datasets based on the previously completed steps.

The method can model entities by simulating entity actions to train the machine learning model. The method can incorporate any type of possible user action. A page view, add-to-cart action, or checkout process are expandable and/or exchangeable examples.

Below, system embodiments will be discussed. These embodiments are abbreviated by the letter "S" followed by a number. Whenever reference is herein made to "system embodiment", these embodiments are meant.

S1. A system for providing tracking data comprising a processing component (101) configured:
- to receive an event dataset comprising a plurality of entity identifiers,
- to generate a tracking identification based on the entity identifiers,
- to generate a plurality of identification groups based on a subset of entity identifiers,
- to determine a similarity measure between the tracking identification and an identification group of the plurality of identification groups,
- and to assign the tracking identification to one of the identification groups based on the similarity measure.

S2. The system according to the preceding embodiment, wherein the tracking identification is a universally unique identifier.

S3. The system according to any of the preceding embodiments, wherein the tracking identification is unique.

S4. The system according to any of the preceding embodiments, wherein the processing component (101) is configured to encrypt the event dataset.

S5. The system according to any of the preceding embodiments, wherein the processing component (101) is configured to assign a group identifier to each identification group.

S6. The system according to any of the preceding embodiments, wherein the group identifier is a universally unique identifier.

S7. The system according to any of the preceding embodiments, wherein each group represents an entity.

S8. The system according to any of the preceding embodiments, wherein the processing component (101) is configured to determine a similarity measure between the tracking identification and each identification group of the plurality of identification groups and to assign the tracking identification to one of the identification groups based on the similarity measure indicating the greatest similarity between the tracking identification and the identification group.

S9. The system according to any of the preceding embodiments, wherein the processing component (101) is configured to identify an entity based on the tracking identification being assigned to a specific identification group.

S10. The system according to any of the preceding embodiments, comprising a database module (102) configured to store event datasets with the assigned group identifier.

S11. The system according to any of the preceding embodiments, wherein the database module (102) is an object relational database management system.

S12. The system according to any of the preceding embodiments, wherein the database module (102) is configured to generate context data which comprises information on assigning a tracking identification to an identification group.

S13. The system according to any of the preceding embodiments with the features of S12, wherein the database module (102) is configured to generate the context data based on the event data.

S14. The system according to any of the preceding embodiments with the features of S12, wherein the processing component (101) is configured to receive the context data provided by the database module (102).

S15. The system according to any of the preceding embodiments, wherein the processing component (101) comprises a representational state transfer (REST) interface module, in particular a REST application interface module (API), configured to provide a communication interface to a receiver node (105).

S16. The system according to any of the preceding embodiments, wherein the processing component (101) is configured to generate analytical data, in particular pageview data, based on the assigning of a tracking identification to an identification group.

S17. The system according to any of the preceding embodiments comprising a receiver node (105) configured to receive analytical data.

S18. The system according to any of the preceding embodiments, wherein the processing component is configured to provide analytical data to the receiver node (105), in particular upon request by the receiver node (105).

S19. The system according to any of the preceding embodiments with the features of S16, wherein the analytical data comprises at least one data element of the following data element categories:
- platform interaction data of an entity;
- finger print data uniquely identifying a specific entity;
- advertising interaction data;
- cross-domain tracking data;
- cross-site tracking data;
- cross-device tracking data;
- cross-session tracking data.

S20. The system according to any of the preceding embodiments with the features of S16, wherein the analytical data comprises at least one data element of an entity footprint, hardware footprint, script footprint and/or an action footprint.

S21. The system according to any of the preceding embodiments comprising an event data module (103) configured to receive and store event datasets.

S22. The system according to any of the preceding embodiments with the features of S21, wherein the event data module (103) is an in-memory data structure store comprising a distributed, in-memory key-value database, cache and message broker.

S23. The system according to any of the preceding embodiments with the features of S21, wherein the event data module (103) is a stack and configured to provide event datasets to the processing component (101), in particular as a sequential queue of event datasets.

S24. The system according to any of the preceding embodiments with the features of S21, wherein the event data module (103) is configured to anonymize the event dataset.

S25. The system according to any of the preceding embodiments with the features of S24, wherein anonymizing comprises at least one of the following:
- selecting a subset of entity identifiers as an event dataset;
- removing a subset of entity identifiers from an event dataset;
- obfuscating an entity identifier;
- hashing an event dataset and/or at least one entity identifier;
- truncating an event dataset and/or at least an entity identifier;
- scrambling at least part of an event dataset and/or at least part of an entity identifier.

S26. The system according to any of the preceding embodiments with the features of S21, wherein the event data module (103) is configured as a software service.

S27. The system according to any of the preceding embodiments with the features of S21, wherein the event data module (103) is configured to process the event dataset and to generate a reduced dataset based on the event dataset and provide the reduced dataset as an event dataset to the processing component (101).

S28. The system according to any of the preceding embodiments with the features of S27, wherein the reduced dataset comprises entity identifiers in compliance with a set of data privacy rules.

S29. The system according to any of the preceding embodiments with the features of S27, wherein the reduced dataset comprises a set of entity identifiers configured to represent the entity independent from at least one of the following:
- the device the event dataset is captured on;
- the provider of the event dataset, in particular independent of the client hardware, client services, server hardware and/or server services;
- the time of capture of the event dataset;
- the unique network identifier (i.e., IP-address. MAC-address).

S30. The system according to any of the preceding embodiments with the features of S21, wherein the processing component (101) comprises the event data module (103).

S31. The system according to any of the preceding embodiments, wherein the processing component (101) and/or the event data module (103) are configured to generate the plurality of identification groups such that each pair of two groups of the plurality of groups is spaced apart by at least a predetermined proximity threshold value within the parameter range for a selected entity identifier.

S32. The system according to any of the preceding embodiments with the features of S21, wherein the processing component (101) and/or the event data module (103) are configured to generate one group per unique entity.

S33. The system according to any of the preceding embodiments, wherein each identity identifier is a parameter of an identification parameter space and wherein the processing component and/or the event data module (103) are configured to generate non-intersecting identification groups within the parameter space.

S34. The system according to any of the preceding embodiments with the features of S33, wherein the processing component (101) is configured to assign an event dataset to an identification group when at least one entity identifier of the event dataset falls within a corresponding value bracket for that entity identifier and the corresponding value bracket is assigned to the identification group.

S35. The system according to any of the preceding embodiments with the features of S34, wherein the processing component (101) is configured to set a priority order of entity identifiers and to assign an event dataset to an identification group based on the priority order of the entity identifiers comprised within the event dataset.

S36. The system according to any of the preceding embodiments with the features of S35, wherein the processing component (101) is configured to assign the event dataset to an identification group based on the entity identifier with the highest priority.

S37. The system according to any of the preceding embodiments, wherein the processing component (101) is configured to uniquely assign an event dataset to an identification group when the event dataset comprises a first entity identifier having a value within a first value bracket assigned to a first group and comprises a second entity identifier having a value within a second value bracket assigned to a second group.

S38. The system according to any of the preceding embodiments with the features of S36, wherein the processing component (101) is configured to uniquely assign the event dataset to the first identification group when the first entity identifier has a higher priority than the second entity identifier.

S39. The system according to any of the preceding embodiments, wherein the event data module is an in-memory database management system configured to use primary memory [RAM] to store event datasets.

S40. The system according to any of the preceding embodiments, wherein the processing component (101) comprises a machine learning module (104) configured to generate a similarity measure of the tracking identification to an identification group of the plurality of identification groups and to assign the tracking identification to an identification group based on the similarity measure.

S41. The system according to any of the preceding embodiments. wherein the processing component (101) is configured to assign a value bracket for each entity identifier comprised within each identification group.

S42. The system according to any of the preceding embodiments, wherein the processing component (101) is configured to select a set of entity identifiers to represent an identification group based on a set of data privacy rules.

S43. The system according to any of the preceding embodiments with the features of S21, wherein the event data module (103) is configured to provide a limited event dataset to the processing component, wherein the limited event dataset comprises a subset of entity identifiers of the identity identifiers comprised in the event dataset.

S44. The system according to any of the preceding embodiments with the features of S12, wherein the machine learning module (104) is configured to process the context information and base assigning the tracking identification to an identification group on the context information.

S45. The system according to any of the preceding embodiments with the features of S40, wherein the machine learning module (104) is configured to increase a matching precision of the tracking identification to an identification group based on a plurality of event datasets.

S46. The system according to any of the preceding embodiments with the features of S40, wherein the machine learning module (104) is configured independent from preset rules.

S47. The system according to any of the preceding embodiments with the features of S40, wherein the machine learning module (104) is configured to be trained based on a plurality of event datasets.

S48. The system according to any of the preceding embodiments with the features of S40, wherein the machine learning module (104) is configured to learn correlations based on a plurality of event datasets.

S49. The system according to any of the preceding embodiments with the features of S40, wherein the machine learning module (104) is configured to generate a set of rules based on learned correlations, wherein the set of rules determines the assigning of a tracking identification representing an event dataset to an identification group.

S50. The system according to any of the preceding embodiments with the features of S40, wherein the machine learning module (104) is configured to match event datasets received from at least two nodes to a single entity.

S51. The system according to any of the preceding embodiments, wherein the single entity is represented by a unique tracking identification.

S52. The system according to any of the preceding embodiments, wherein the single entity is represented by a unique group identification.

S53. The system according to any of the preceding embodiments with the features of S48, wherein the machine learning module (104) is configured to project an event dataset onto a learned correlation to identify the event dataset as an entity action.

S54. The system according to any of the preceding embodiments with the features of S53, wherein the machine learning module (104) is configured to generate meta data based on identifying the entity action.

S55. The system according to any of the preceding embodiments with the features of S54, wherein the machine learning module (104) is configured to include the meta data to the event dataset.

S56. The system according to any of the preceding embodiments, wherein the processing component (101) is configured to generate tracking data for an entity, wherein the tracking data comprises at least one of the following:
  a set of entity actions;
  a plurality of event datasets;
  a time series of event datasets or entity identifiers;
  a location series of an entity.

S57. The system according to any of the preceding embodiments with the features of S56, wherein the processing component (101) is configured to generate the tracking data for an entity based on a plurality of event datasets assigned to a specific identification group representing a single entity.

S58. The system according to any of the preceding embodiments, wherein the processing component (101) is configured to provide tracking data related to a specific entity to a receiver node (105).

S59. The system according to any of the preceding embodiments, wherein a receiver node (105) is configured to request tracking data for an entity or a plurality of entities from the processing component (101).

S60. The system according to any of the preceding embodiments, wherein the processing component (101) is configured to weight the entity identifiers and assign the tracking identity corresponding to the weighted entity identifiers to an identification group on the basis of the weighted entity identifiers.

S61. The system according to any of the preceding embodiments comprising a gate module (106) configured to capture interaction events and to generate the event dataset based on the interaction events.

S62. The system according to any of the preceding embodiments with the features of S61, wherein the gate module (106) comprises a reverse proxy server, in particular a DNS reverse proxy server, configured to receive entity queries and forward the entity queries to a server, in particular a platform server.

S63. The system according to any of the preceding embodiments with the features of S62, wherein the gate module (106) is configured to generate the event dataset based on the entity queries.

S64. The system according to any of the preceding embodiments comprising a node (107) configured to capture an entity input and/or wherein the gate module (106) is configured to generate the event dataset at least partly on the basis of the entity input received by the node (107).

S65. The system according to any of the preceding embodiments with the features of S64, wherein the node comprises an input device, configured to capture an entity input sequence, and wherein the node is configured to provide the input sequence to the gate module (106) as an entity identifier within an entity dataset.

S66. The system according to any of the preceding embodiments with the features of S65, wherein the processing component is configured to determine an input pattern based on the input sequence and to assign the event dataset to an identification group based on the determined input pattern.

S67. The system according to any of the preceding embodiments with the features of S64, wherein the gate module (106) and/or the node (107) are configured to execute a platform application and configured to capture platform interactions at the platform application and to generate an event dataset based on the captured platform interactions.

S68. The system according to any of the preceding embodiments comprising a beacon module (108) configured to receive an event dataset, in particular receive the event dataset from the node (107), and to forward the event dataset to the gate module (106).

S69. The system according to any of the preceding embodiments, wherein the gate module (106) comprises a content server (109) configured to receive entity requests based on an entity input and to generate at least part of the event dataset based on the entity request.

S70. The system according to any of the preceding embodiments with the features of S69, wherein the content server (109) is configured to execute a platform application and configured to capture platform interactions at the platform application and to generate an event dataset based on the captured platform interactions.

S71. The system according to any of the preceding embodiments with the features of S21 and S61, wherein the gate module (106) is configured to anonymize the event dataset and provide the anonymized event dataset to the event data module (103).

S72. The system according to any of the preceding embodiments with the features of S21, wherein the gate module (106) and/or the event data module (103) is configured to anonymize the event dataset and provide the anonymized event dataset to the processing component (101).

S73. The system according to any of the preceding embodiments with the features of S61, wherein the gate module (106) is configured to receive event datasets from a plurality of nodes (106).

S74. The system according to any of the preceding embodiments with the features of S64, wherein the node (107) is configured to generate attribution data.

S75. The system according to any of the preceding embodiments with the features of S74, wherein the gate module and/or the event data module (106) is configured to generate the event dataset at least in part based on the attribution data.

S76. The system according to any of the preceding embodiments comprising a tracking manager module configured to receive the event dataset and to forward the event dataset at least partly and/or a subset of entity identifiers to a third-party service.

S77. The system according to any of the preceding embodiments with the features of S76, wherein the tracking manager module is configured receive a third-party identifier.

S78. The system according to any of the preceding embodiments with the features of S77, wherein the tracking manager module is configured to process the third-party identifier based on an entity action.

S79. The system according to any of the preceding embodiments with the features of S76, wherein the tracking manager module is configured identify an entity based on a third-party entity profile linked to the third-party identifier.

S80. The system according to any of the preceding embodiments with the features of S76, wherein the tracking manager module is configured to provide entity identification data to a third-party identification server based on an entity action performed in conjunction with processing the third-party identifier.

S81. The system according to any of the preceding embodiments, wherein the event dataset comprises at least one of the following key data elements:
purchase data;
shopping cart data;
impressions data; (significant view time of an item)
bookmark data; (item saved for later review).

S82. The system according to any of the preceding embodiments, wherein the processing component (101) is configured to separate at least one key data element from the event dataset.

S83. The system according to any of the preceding embodiments with the features of S82, wherein the processing component (101) is configured to provide at least one key data element to a receiver, wherein the receiver is one of: the gate module (106), the node (107), the beacon module (108), the content server (109) and/or the event data module (103).

S84. The system according to any of the preceding embodiments with the features of S83, wherein the receiver is configured to restore a session data element within a session of an entity based on the received key data element.

S85. The system according to any of the preceding embodiments with the features of S82, wherein the processing component (101) is configured to provide the at least one key data element when an event dataset from an active session at the receiver is assigned to an identification group which comprises a key data element by the processing component (101).

S86. The system according to any of the preceding embodiments with the features of S82, wherein the processing component (101) is configured to provide the at least one key data element independent from at least one of the following:
the device the event dataset is captured on;
the provider of the event dataset, in particular independent of the client hardware, client services, server hardware and/or server services;
the time of capture of the event dataset;
the unique network identifier (i.e., IP-address. MAC-address).

S87. The system according to any of the preceding embodiments with the features of S40, wherein the machine learning module (104) is configured to generate artificial event datasets based on a plurality of existing event datasets, wherein each dataset of the plurality of existing event datasets comprises a unique entity information such that each event dataset is assigned to a specific entity.

S88. The system according to any of the preceding embodiments with the features of S87, wherein the machine learning module (104) is configured to generate a set of rules for assigning event datasets to a specific identification group based on the artificial event datasets and/or existing event datasets.

S89. The system according to any of the preceding embodiments with the features of S40, wherein the machine learning module comprises a generative network configured to generate the artificial datasets to train the machine learning module.

S90. The system according to any of the preceding embodiments with the features of S40, wherein the machine learning module (104) comprises a reconstruction component configured to provide an estimate of an event dataset matching a specific entity.

S91. The system according to any of the preceding embodiments comprising an advertisement allocation module configured to manage exposure values of a plurality of advertisement elements.

S92. The system according to any of the preceding embodiments with the features of S91, wherein the processing component (101) is configured to modify the exposure value for each advertisement of the plurality of advertisement elements.

S93. The system according to any of the preceding embodiments with the features of S91, wherein the node is configured to display an advertisement element based on its exposure value.

S94. The system according to any of the preceding embodiments with the features of S91, wherein the processing component (101) is configured to determine and/or modify an exposure value based on processed entity datasets such that the exposure value of each advertisement element scales proportional to its effectiveness, wherein an advertisement effectiveness can be determined by the processing component on the basis of event datasets corresponding to entity interactions with the respective advertisement element.

S95. The system according to any of the preceding embodiments, wherein the processing component (101) is configured to determine an exposure value in relation to the platform the respective advertisement is placed on and/or viewed on by an entity, such that the advertisement display can be optimized across platforms.

S96. The system according to any of the preceding embodiments, wherein the processing component is configured to determine an efficiency ratio of advertising cost and advertising volume and/or advertisement type based on the event datasets.

S97. The system according to any of the preceding embodiments, wherein the processing component (101) is configured to modify an exposure value of an advertisement element based on the efficiency ratio.

S98. The system according to any of the preceding embodiments, wherein the processing component (101) is configured to assign a fractional impact value to each event dataset and/or to each entity action comprising of a plurality of event datasets, and wherein the fractional impact value defines a probability of the respective event dataset and/or entity action to lead to a purchase of an item by the entity.

S99. The system according to any of the preceding embodiments, wherein the processing component (101) is configured to track an interaction of an entity with an advertisement element based on the event datasets, comprising at least one of the following event parameters:
- time interval spent by the node and/or entity on a webpage;
- number of pages accessed by the node and/or entity;
- time spent displaying media by the node;
- scrolling distance, in particular scrolling distance per webpage;
- progress within a defined entity action, i.e. progress of a purchase;
- starting of a checkout process;
- time interval between a current interaction session and a previous interaction session with the same platform.

S100. The system according to any of the preceding embodiments, wherein the processing component (101) is configured to assign a significance value to an advertisement element based on the event dataset.

S101. The system according to any of the preceding embodiments, wherein the processing component (101) is configured to categorize an entity interaction based on the event dataset into an entity action category, wherein the entity action category is one of the following:
- attention action;
- interest action;
- desire action;
- purchase action;
- initializer action;
- holder action;
- closer action.

S102. The system according to any of the preceding embodiments, wherein the processing component (101) is configured to determine an impact of each event parameter on the probability to complete a purchase and/or configured to weight the event parameters based on this impact of the respective parameter.

S103. The system according to any of the preceding embodiments, wherein the processing component (101) and/or the machine learning module (104) are configured to detect a break within an entity interaction based on a set of entity datasets and to generate meta data indicating the break (i.e., a break within an entity interaction can be indicated by a set of event datasets indicating an intent to purchase, but the purchase is not completed).

S104. The system according to any of the preceding embodiments wherein the processing component (101) and/or the machine learning module (104) are configured to generate item data based on tracking an advertisement element and evaluating the impact of the advertisement element on a completed purchase of an item Below, method embodiments will be discussed. These embodiments are abbreviated by the letter "M" followed by a number. Whenever reference is herein made to "method embodiments", these embodiments are meant.

M1. A method for providing tracking data, the method comprising the steps of:
- receiving an event dataset comprising a plurality of entity identifiers;
- generating a tracking identification based on the entity identifiers;
- determining a similarity measure between the tracking identification and an identification group of the plurality of identification groups; and
- assigning the tracking identification to one of the identification groups based on the similarity measure.

M2. The method according to the preceding embodiment comprising the step of encrypting the event dataset.

M3. The method according to any of the preceding embodiments comprising the step of assigning a group identifier to each identification group.

M4. The method according to any of the preceding embodiments comprising the steps of determining a similarity measure between the tracking identification and each identification group of the plurality of identification groups and assigning the tracking identification to one of the identification groups based on the similarity measure indicating the greatest similarity between the tracking identification and the identification group.

M5. The method according to any of the preceding embodiments comprising the step of identifying an entity based on the tracking identification being assigned to a specific identification group.

M6. The method according to any of the preceding embodiments comprising the step of storing the event datasets with the assigned group identifier by means of a database module.

M7. The method according to any of the preceding embodiments comprising the step of generating context data which comprises information on assigning a tracking identification to an identification group.

M8. The method according to any of the preceding embodiments with the features of M7 comprising the step of generating the context data based on the event data.

M9. The method according to any of the preceding embodiments with the features of M7 comprising the step of receiving the context data provided by a database module.

M10. The method according to any of the preceding embodiments comprising the step of providing a communication interface to a receiver node (105) by means of a state transfer interface module.

M11. The method according to any of the preceding embodiments comprising the step of generating analytical data based on the assigning of a tracking identification to an identification group.

M12. The method according to any of the preceding embodiments comprising the step of providing analytical data to a receiver node (105), in particular upon receiving a request by the receiver node (105).

M13. The method according to any of the preceding embodiments comprising the step of receiving and storing event datasets by means of an event data module.

M14. The method according to any of the preceding embodiments comprising the step of anonymizing the event dataset.

M15. The method according to any of the preceding embodiments with the features of M14, wherein anonymizing comprises at least one of the following:

selecting a subset of entity identifiers as an event dataset;
removing a subset of entity identifiers from an event dataset;
obfuscating an entity identifier;
hashing an event dataset and/or at least one entity identifier;
truncating an event dataset and/or at least an entity identifier;
scrambling at least part of an event dataset and/or at least part of an entity identifier.

M16. The method according to any of the preceding embodiments comprising the step of processing the event dataset and generating a reduced dataset based on the event dataset and providing the reduced dataset as an event dataset, in particular to the processing component.

M17. The method according to any of the preceding embodiments comprising the step of generating the plurality of identification groups such that each pair of two groups of the plurality of groups is spaced apart by at least a predetermined proximity threshold value within the parameter range for a selected entity identifier.

M18. The method according to any of the preceding embodiments comprising the step of generating one group per unique entity.

M19. The method according to any of the preceding embodiments, wherein each identity identifier is a parameter of an identification parameter space and the method comprises the step of generating non-intersecting identification groups within the parameter space.

M20. The method according to any of the preceding embodiments with the features of M19 comprising the step of assigning an event dataset to an identification group when at least one entity identifier of the event dataset falls within a corresponding value bracket for that entity identifier and the corresponding value bracket is assigned to the identification group.

M21. The method according to any of the preceding embodiments comprising the step of setting a priority order of entity identifiers and assigning an event dataset to an identification group based on the priority order of the entity identifiers comprised within the event dataset.

M22. The method according to any of the preceding embodiments with the features of M21 comprising the step of assigning the event dataset to an identification group based on the entity identifier with the highest priority.

M23. The method according to any of the preceding embodiments comprising the step of assigning an event dataset uniquely to one identification group when the event dataset comprises a first entity identifier having a value within a first value bracket assigned to a first group and comprises a second entity identifier having a value within a second value bracket assigned to a second group.

M24. The method according to any of the preceding embodiments with the features of M23 comprising the step of assigning the event dataset uniquely to the first identification group when the first entity identifier has a higher priority than the second entity identifier.

M25. The method according to any of the preceding embodiments comprising the step of assigning a value bracket for each entity identifier comprised within each identification group.

M26. The method according to any of the preceding embodiments comprising the step of selecting a set of entity identifiers to represent an identification group based on a set of data privacy rules.

M27. The method according to any of the preceding embodiments comprising the step of providing a limited event dataset to the processing component, wherein the limited event dataset comprises a subset of entity identifiers of the identity identifiers comprised in the event dataset.

M28. The method according to any of the preceding embodiments with the features of M7 comprising the step of processing context information and assigning the tracking identification to an identification group based on the context information.

M29. The method according to any of the preceding embodiments comprising the step of increasing a matching precision of the tracking identification to an identification group based on a plurality of event datasets.

M30. The method according to any of the preceding embodiments comprising the step of generating a set of rules based on learned correlations, wherein the set of rules determines the assigning of a tracking identification representing an event dataset to an identification group.

M31. The method according to any of the preceding embodiments comprising the step of matching event datasets received from at least two nodes to a single entity.

M32. The method according to any of the preceding embodiments comprising the step of projecting an event dataset onto a learned correlation to identify the event dataset as an entity action.

M33. The method according to any of the preceding embodiments comprising the step of generating meta data based on identifying the entity action.

M34. The method according to any of the preceding embodiments comprising the step of generating tracking data for an entity, wherein the tracking data comprises at least one of the following:
a set of entity actions;
a plurality of event datasets;
a time series of event datasets or entity identifiers;
a location series of an entity.

M35. The method according to any of the preceding embodiments comprising the step of generating the tracking data for an entity based on a plurality of event datasets assigned to a specific identification group representing a single entity.

M36. The method according to any of the preceding embodiments comprising the step of weighting the entity identifiers and assigning the tracking identity corresponding to the weighted entity identifiers to an identification group on the basis of the weighted entity identifiers.

M37. The method according to any of the preceding embodiments comprising the step of capturing interaction events and generating the event dataset based on the interaction events.

M38. The method according to any of the preceding embodiments comprising the step of receiving entity queries and forwarding the entity queries to a server.

M39. The method according to any of the preceding embodiments with the features of M38 comprising the step of generating event datasets based on the entity queries.

M40. The method according to any of the preceding embodiments comprising the step of receiving an entity request based on an entity input and generating at least part of the event dataset based on the entity request.

M41. The method according to any of the preceding embodiments comprising the step of executing a platform application, capturing platform interactions at the platform application and/or generating an event dataset based on the captured platform interactions.

M42. The method according to any of the preceding embodiments comprising the step of generating attribution data.

M43. The method according to any of the preceding embodiments with the features of M42 comprising the step of generating the event dataset at least in part based on the attribution data.

M44. The method according to any of the preceding embodiments comprising the step of receiving the event dataset and forwarding the event dataset and/or a subset of entity identifiers to a third-party service.

M45. The method according to any of the preceding embodiments comprising the step of receiving a third-party identifier.

M46. The method according to any of the preceding embodiments comprising the step of separating at least one key data element from the event dataset.

M47. The method according to any of the preceding embodiments with the features of M46 comprising the step of providing at least one key data element to a receiver, wherein the receiver is one of: the gate module (106), the node (107), the beacon module (108), the content server (109) and/or the event data module (103).

M48. The method according to any of the preceding embodiments with the features of M46 comprising the step of restoring a session data element within a session of an entity based on the received key data element.

M49. The method according to any of the preceding embodiments with the features of M46 comprising the step of providing the at least one key data element when an event dataset from an active session at the receiver is assigned to an identification group which comprises a key data element.

M50. The method according to any of the preceding embodiments comprising the step of providing the at least one key data element independent from at least one of the following:
the device the event dataset is captured on;
the provider of the event dataset, in particular independent of the client hardware, client services, server hardware and/or server services;
the time of capture of the event dataset;
the unique network identifier (i.e., IP-address. MAC-address).

M51. The method according to any of the preceding embodiments comprising the step of generating artificial event datasets based on a plurality of existing event datasets, wherein each dataset of the plurality of existing event datasets comprises a unique entity information such that each event dataset is assigned to a specific entity.

M52. The method according to any of the preceding embodiments with the features of M51 comprising the step of generating a set of rules for assigning event datasets to a specific identification group based on the artificial event datasets and/or existing event datasets.

M53. The method according to any of the preceding embodiments comprising the step of providing an estimate of an event dataset matching a specific entity.

What is claimed is:

1. A system comprising:
one or more processors; and
memory storing executable instructions that, when executed by the one or more processors, cause a computing device to perform, independent of login information and/or account information of an entity, a process for providing tracking data comprising:
receiving an event dataset comprising a plurality of entity identifiers;
generating a tracking identification based on the entity identifiers;
generating a plurality of identification groups based on a subset of entity identifiers comprising generating one identification group per unique entity;
determining a similarity measure between the tracking identification and an identification group of the plurality of identification groups;
assigning the tracking identification to the identification group based on the similarity measure;
capturing interaction events;
generating the event dataset based on the interaction events; and
using a gate module comprising a reverse proxy server to receive entity queries and forward the entity queries to a server.

2. The system according to claim 1, wherein the process further comprises identifying an entity based on the tracking identification being assigned to a specific identification group.

3. The system according to claim 1, wherein the process further comprises generating, based on the event data, context data which comprises information on assigning the tracking identification to the identification group.

4. The system according to claim 3, wherein the process further comprises:
using a machine learning module to process the context information and to base assigning the tracking identification to the identification group on the context information, and
using the machine learning module to match event datasets received from at least two nodes to a single entity.

5. The system according to claim 4, wherein the process further comprises using the machine learning module to generate a set of rules based on learned correlations, wherein the set of rules determines the assigning of the tracking identification to the identification group.

6. The system according to claim 4, wherein the process further comprises using the machine learning module to provide an estimate of the event dataset matching a specific entity.

7. The system according to claim 1, wherein the generating the tracking identification comprises:
processing the event dataset; and
generating a reduced dataset based on the event dataset for generating the tracking identification.

8. The system according to claim 7, wherein the process further comprises generating the plurality of identification groups such that each pair of two identification groups of the plurality of identification groups is spaced apart by at least a predetermined proximity threshold value within a parameter range for a selected entity identifier.

9. The system according to claim 1, wherein the process further comprises:
assigning a value bracket for each entity identifier within each identification group, and
selecting a set of entity identifiers to represent the identification group based on a set of data privacy rules.

10. The system according to claim 1, wherein the process further comprises:
weighting the entity identifiers; and
assigning the tracking identification corresponding to the weighted entity identifiers to an identification group based on the weighted entity identifiers.

11. The system according to claim 1, wherein the process further comprises:
storing event datasets, and anonymizing the event dataset; and providing the anonymized event dataset for generating a reduced dataset.

12. The system according to claim 1, wherein the process further comprises:
   receiving the event dataset;
   forwarding the event dataset at least partly to a third-party service;
   receiving a third-party identifier; and
   processing the third-party identifier based on an entity action.

13. The system according to claim 12, wherein the process further comprises providing entity identification data to a third-party identification server based on the entity action performed in conjunction with processing the third-party identifier.

14. The system according to claim 1, wherein the process further comprises generating attribution data based on a statistical or dynamical event-based attribution model, wherein an attribution value is assigned to each interaction by an entity with a platform represented by the event dataset, and wherein the attribution value indicates a measure of significance of a respective entity dataset to reaching a positive final action.

15. The system according to claim 1, wherein the event dataset comprises at least one key data element comprising:
   purchase data;
   shopping cart data;
   impressions data indicating a significant view time of an item; and
   bookmark data indicating an item saved for later review; and
   wherein the process further comprises separating the at least one key data element from the event dataset and restoring a session data element within a session of an entity based on the at least one key data element.

16. The system according to claim 1, wherein the process further comprises assigning a fractional impact value to each event dataset and/or to each entity action comprising of a plurality of event datasets, and wherein the fractional impact value defines a probability of the respective event dataset to lead to a purchase action, and wherein the process further comprises generating item data based on the plurality of fractional impact values.

17. The system according to claim 1, wherein the process further comprises determining an exposure value based on processed entity datasets such that the exposure value of each advertisement element scales proportional to its effectiveness, wherein an advertisement effectiveness is determined based on the basis of event datasets corresponding to entity interactions with the respective advertisement element.

18. The system according to claim 1, wherein:
   each entity identifier is a parameter of an identification parameter space; and
   the process further comprises generating non-intersecting identification groups within the parameter space.

19. A method for providing tracking data, independent of login information and/or account information of an entity, the method comprising:
   receiving an event dataset comprising a plurality of entity identifiers;
   generating a tracking identification based on the entity identifiers;
   generating a plurality of identification groups based on a subset of entity identifiers comprising generating one identification group per unique entity;
   determining a similarity measure between the tracking identification and an identification group of the plurality of identification groups;
   assigning the tracking identification to the identification group based on the similarity measure;
   capturing interaction events;
   generating the event dataset based on the interaction events; and
   using a gate module comprising a reverse proxy server to receive entity queries and forward the entity queries to a server.

* * * * *